US008495151B2

(12) United States Patent
Bodapati et al.

(10) Patent No.: US 8,495,151 B2
(45) Date of Patent: Jul. 23, 2013

(54) METHODS AND SYSTEMS FOR DETERMINING EMAIL ADDRESSES

(76) Inventors: Chandra Bodapati, Saratoga, CA (US); Fatema Mansoor Mukadam, Parrys Chennai (IN); Noel Gunasekar, New York, NY (US)

( * ) Notice: Subject to any disclaimer, the term of this patent is extended or adjusted under 35 U.S.C. 154(b) by 525 days.

(21) Appl. No.: 12/479,591

(22) Filed: Jun. 5, 2009

(65) Prior Publication Data
US 2010/0312837 A1 Dec. 9, 2010

(51) Int. Cl.
*G06F 15/16* (2006.01)
(52) U.S. Cl.
USPC ........... 709/206; 709/207; 709/217; 709/218; 709/219; 709/245; 707/E17.108
(58) Field of Classification Search
USPC ... 709/206, 217–219, 207, 245; 707/E17.108
See application file for complete search history.

(56) References Cited

U.S. PATENT DOCUMENTS

| | | | |
|---|---|---|---|
| 6,189,003 B1 * | 2/2001 | Leal | 1/1 |
| 6,591,306 B1 * | 7/2003 | Redlich | 709/245 |
| 6,778,986 B1 * | 8/2004 | Stern et al. | 1/1 |
| 2002/0194192 A1 * | 12/2002 | Dietz | 707/104.1 |
| 2003/0115280 A1 * | 6/2003 | Quine et al. | 709/207 |
| 2004/0199587 A1 * | 10/2004 | McKnight | 709/206 |
| 2005/0125451 A1 * | 6/2005 | Mooney | 707/104.1 |
| 2006/0010215 A1 * | 1/2006 | Clegg et al. | 709/206 |
| 2006/0069730 A1 * | 3/2006 | Azuma | 709/206 |
| 2010/0077041 A1 * | 3/2010 | Cowan et al. | 709/206 |
| 2010/0082777 A1 * | 4/2010 | Montgomery et al. | 709/220 |

FOREIGN PATENT DOCUMENTS

| | | | |
|---|---|---|---|
| CA | 2301272 A1 * | 9/2001 | |
| WO | WO 2007016869 A2 * | 2/2007 | |

* cited by examiner

*Primary Examiner* — Ario Etienne
*Assistant Examiner* — Michael C Lai

(57) ABSTRACT

Disclosed herein is a method and system for a user to find an email address using the Internet. The user inputs the information that he wants to be verified or completed. A seeking unit determines the missing fields in the input information. The seeking unit may determine the missing information in the email address from various sources on the Internet, using a set of rules. The rules may be specified by the user or present in the database. The obtained search results are ranked by a ranking unit, based on the relevance of the scores. The seeking unit may also display the found email information along with the ranks to the user. The user has the option to sort the email information. The user may then select the most accurate email information, according to him, which is then used to populate the field in the information.

9 Claims, 17 Drawing Sheets

FIG. 9

| Email Object 901 |
| --- |
| Email String 902 |
| Word Count 903 |
| Emailpart Array 904 |
| Separator Count 905 |
| Domain 906 |
| Source of email 907 |
| Name 908 |
| First name 909 |
| Last name 910 |
| Middle name 911 |
| Exact email weight 912 |
| Weight based on name match 913 |
| Weight based on Domain match 914 |
| Weight based on source match 915 |
| Weight based on Pattern match 916 |
| Total weight 917 |
| Email count 918 |

FIG. 10

| EmailPartObject |
|---|
| EmailPartString 1001 |
| Alphabet Count 1002 |
| Special character count 1003 |
| Number Count 1004 |
| Vowel count 1005 |
| IsTwoConsonantAtStart 1006 |
| dbFirstName 1007 |
| dbLastName 1008 |
| dbNickName 1009 |
| dbknown 1010 |
| dbUnknown 1011 |
| dbGeneralEmail 1012 |

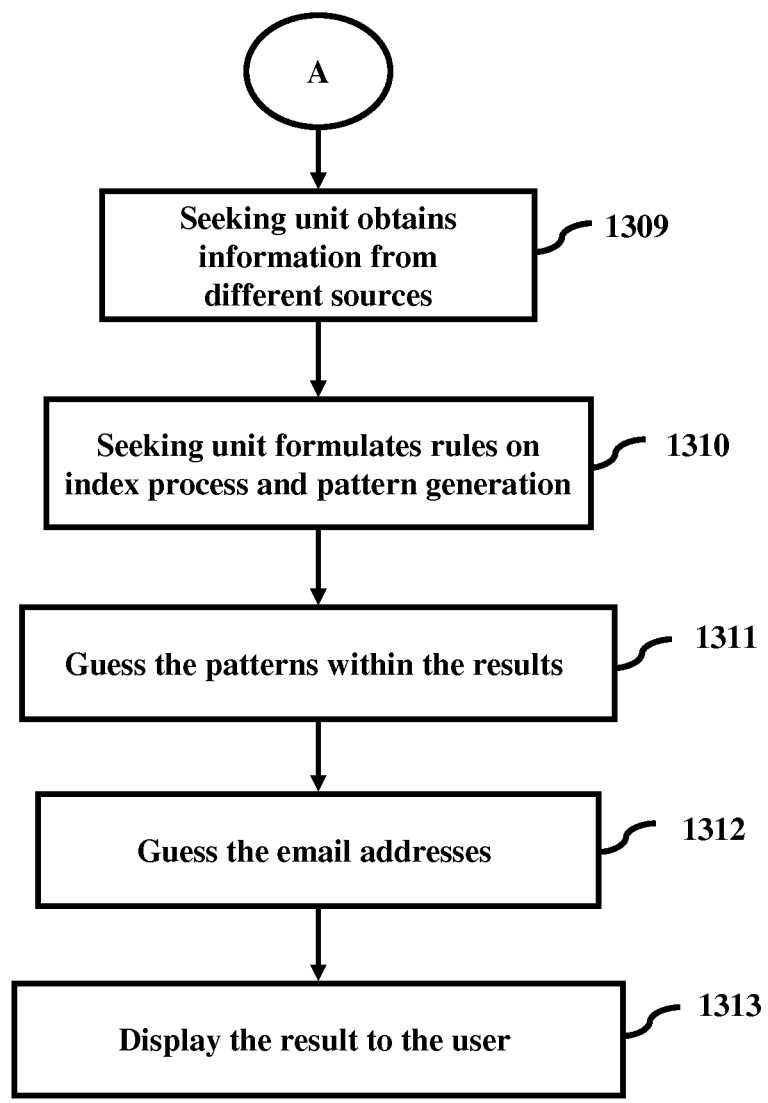

METHODS AND SYSTEMS FOR DETERMINING EMAIL ADDRESSES

TECHNICAL FIELD

The embodiments herein relate to the Internet, and, more particularly, to searching for information on the Internet.

BACKGROUND

Finding contact information of people is a well-known problem. In business, both commercial and non-commercial, the need to find contact information of people is crucial for its success. As an illustration, a recruiter may want to find experts in a particular field or a sales person may want to update all contacts in his/her address book with the latest and valid contact information.

In the current electronic era, there are multiple and freely available sources of information like the Internet available. On the Internet, a person's contact information could be present in varied sources such as the website of his employer, a blog run by the person, profiles on social networking sites (for example, FaceBook, MySpace, Orkut, LinkedIn and so on) and so on. The availability of this plethora of information has made this problem to be addressed in much more efficient ways. For example, we have membership directories listing contact information. We also have access to more user generated contents like blogs, resumes and personal web pages. These user generated contents generally provide contact information of the user to whom the content belongs.

Further, we see that availability of multiple sources of information poses new problems. For example, we find that information about an entity is spread across disparate sources, with sources varying in their credibility, usage and its relevance. A recruiter can find list of names of keynote speakers from a conference web page, while their contact information is available in social-networking site or from their personal blogs. Also, some sources may not be accurate or up to date.

SUMMARY

In view of the foregoing, an embodiment herein provides a system and method for calculating statistics of all objects. The statistics are calculated using data structures.

Embodiments further disclose a method of providing a user with an email address of a second person using sources available on the Internet. The method comprises steps of identifying the sources of information, querying the sources for email address of the second person, collecting probable email addresses of the second person from the sources, assigning a relevancy score to probable email addresses and ranking probable email addresses on basis of relevancy score. The source of information may be a database comprising of a list of sources. The sources of information may be sources detected on Internet, being identified by querying search engines on Internet or a list of sources provided by the user. Further, a seeking unit queries the sources for email address of second person. A ranking unit assigns relevancy score to probable addresses and ranks probable email address on basis of relevancy score. Ranked probable email addresses are displayed to the user.

The method provides a user with an email address of a second person, by generating the email address using a set of rules. The set of rules are generated by identifying patterns in a plurality of email addresses and further comprising steps of finding web domain for a target organization, finding email domain for target organization, collecting email addresses belonging to the email domain, collecting corresponding names for email addresses and inferring patterns in the email addresses from the email addresses and corresponding names. The method of finding web domain further comprises of querying search engines on Internet for web domain. Inferring patterns in the email addresses from the email addresses and corresponding names, further comprises steps of extracting username from the email address, calculating statistical information for each of a name and username. The name corresponds to email address, applying rules to each of name and username to obtain statistics, summing up statistics for all of names and corresponding email addresses, applying rules to the statistics to infer patterns in the email addresses. The statistics comprises of alphabet count of username, number count of username, separator count of username, a match for first name of the name in the username and a match for last name of name in the username. Priorities for the patterns are calculated, wherein a priority for a specific pattern of email addresses relies on probability of frequency of specific pattern of email address.

A method for ranking an email address of a person obtained from a source, the ranking is done based on priority of the source and rules to determine validity of email address. The rules comprising of type of name match in the email address, domain correlation with the email address, company name of person found in source and name of person found in the source. Name match comprises of a match of full name of the person with username in the email address, a match of partial name of person with username in email address, a match of substring of name of person with username in email address, a match of initials of name of person with username in email address, a match of name of the person and a second name of person with username in the email address and a match of name of person and name of company. The source of information may be a database comprising of a list of sources. The sources of information are sources detected on Internet, sources being identified by querying search engines on Internet for the sources. Further, source of information is a list of sources provided by the user. High ranking is given to an email address, on email address satisfying conditions comprising of a match of full name of the person with username in the email address, a match of partial name of person with username in the email address, domain of email address matches domain of the company, company name of person found in the source and name of person found in the source. Medium ranking is given to an email address on the email address satisfying conditions comprising of a match of full name of person with username in the email address, a match of partial name of person with username in the email address, domain of email address matches domain of the company and company name of person found in the source. Low ranking is given to an email address on the email address satisfying conditions comprising of a match of full name of person with username in the email address, a match of initials of name of person with username in the email address, a match of characters present in name of person with username in the email address and domain of the email address matches domain of company. A method for providing a user with name of company of a second person on providing email address of the second person, wherein email address does not belong to a personal email domain. The method comprising steps of extracting email domain from the email address, query the email domain for company name, query business listing sources for the company name, if the email domain does not respond, assigning a relevancy score to a plurality of company names, on receiving plurality of company names and ranking plurality of company names on basis of relevancy score. The seeking unit queries email domain and business listing sources for the company name. The ranking unit assigns relevancy score to plurality of company names and ranks plurality of company names on basis of relevancy score. The ranked plurality of company names are displayed to user.

Embodiments herein disclose a method for providing a user with name of a second person, on the user providing email address of the second person, the method comprising steps of extracting user name from the email address; displaying the name to the user, if the user name matches a pattern of user names used in mail client formats; displaying the name to the user, if the name can be obtained from a plurality of sources; displaying the name to the user, if the name can be obtained using the user name by pattern analysis; and displaying the name to the user, if the name can be obtained from the user name using token comparison. The sources are a job portal, a company web site, an online database or any material available on the Internet. On obtaining the name from the plurality of sources, the name is further matched with the email address to check for correlation of the name and the email address. Pattern analysis further comprises steps of generating most probable patterns based on the user name; splitting the user name based on the most probable patterns; and selecting one pattern from the most probable patterns, wherein the pattern is close to pattern of the user name. The token comparison further comprises steps of comparing the user name with a plurality of tokens in a token source, where the email address is present in the token source; and selecting most probable token from the plurality of tokens as the name based on the user name.

The embodiments also disclose a system for providing a user with an email address of a second person, using sources available on the Internet. The system comprising of a seeking unit configured for identifying sources of information, querying the sources for email address of the second person, collecting probable email addresses of the second person from the sources and sending probable email addresses to a ranking unit. The ranking unit configured for assigning a relevancy score to probable email addresses and ranking probable email addresses on basis of relevancy score and a database configured for storing retrieved email addresses, storing relevancy score received from the ranking unit and storing rankings received from the ranking unit. The seeking unit is configured to identify sources of information using one of a database comprising of a list of sources, sources detected on Internet and a list of sources provided by user. The seeking unit is configured to display ranked probable email addresses to the user using a display.

A seeking unit for providing a user with an email address of a second person by generating email address using a set of rules, wherein set of rules are generated by identifying patterns in a plurality of email addresses and further comprising of means configured to find web domain of a target organization, find email domain for target organization, collect email addresses from email domain, collect corresponding names for email addresses and infer patterns in the email addresses from the email addresses and corresponding names. The seeking unit is configured to calculate priorities for patterns, wherein a priority for a specific pattern of email address relies on probability of frequency of specific pattern of email address. A ranking unit for ranking an email address of a person obtained from a source, ranking unit configure to perform ranking based on priority of source and rules to determine validity of email address, rules comprising of type of name match in the email address, domain correlation with email address, company name of the person found in the source and name of person found in source. The ranking unit is configured to match name based on factors comprising of a match of full name of person with username in email address, a match of partial name of person with username in the email address, a match of substring of name of person with username in the email address, a match of initials of name of person with username in email address, a match of name of person and a second name of the person with username in the email address and a match of name of person and name of company.

The ranking unit is configured to assign a high ranking on email address satisfying conditions comprising of a match of full name of the person with username in the email address, a match of partial name of the person with username in the email address, domain of email address matches domain of company, company name of person found in the source and name of the person found in source. The ranking unit is configured to assign an email address a medium ranking on satisfying conditions comprising of a match of full name of person with username in email address, a match of partial name of the person with username in the email address, domain of email address matches domain of the company and company name of person found in the source. The ranking unit is configured to assign an email address a lower ranking on email address satisfying conditions comprising of a match of full name of person with username in email address, a match of initials of name of person with username in email address, a match of characters present in name of person with username in the email address and domain of email address matches domain of company.

A system for providing a user with name of company of a second person on providing email address of second person, wherein the email address may or may not belong to a personal email domain. The system comprising of as seeking unit configured for extracting email domain from email address, querying the email domain for the company name, querying business listing sources for company name, if email domain does not respond and sending a plurality of company names to a ranking unit, on receiving plurality of company names, ranking unit configured for assigning a relevancy score to a plurality of company names, on receiving plurality of company names and ranking plurality of company names on basis of relevancy score and a database configured for storing retrieved company names, storing relevancy score received from the ranking unit and storing rankings received from ranking unit. The display is configured to display ranked plurality of company names to user.

Embodiments herein further disclose a system for providing a user with name of a second person, on the user providing email address of the second person, the system comprising of a seeking unit configured for extracting user name from the email address; checking if the user name matches a pattern of user names used in mail client formats; checking if the name can be obtained from a plurality of sources; checking if the name can be obtained using the user name by pattern analysis; and checking if the name can be obtained from the user name using token comparison. The seeking unit is further configured to match the name with the email address to check for correlation of the name and the email address, on obtaining the name from the plurality of sources.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which:

FIG. 9 depicts a data structure for an email address provided the company name and alias name, according to embodiments disclosed herein;

FIG. 10 depicts a data structure for calculating statistics of all email addresses, according to embodiments disclosed herein;

DETAILED DESCRIPTION OF EMBODIMENTS

Figure 1:
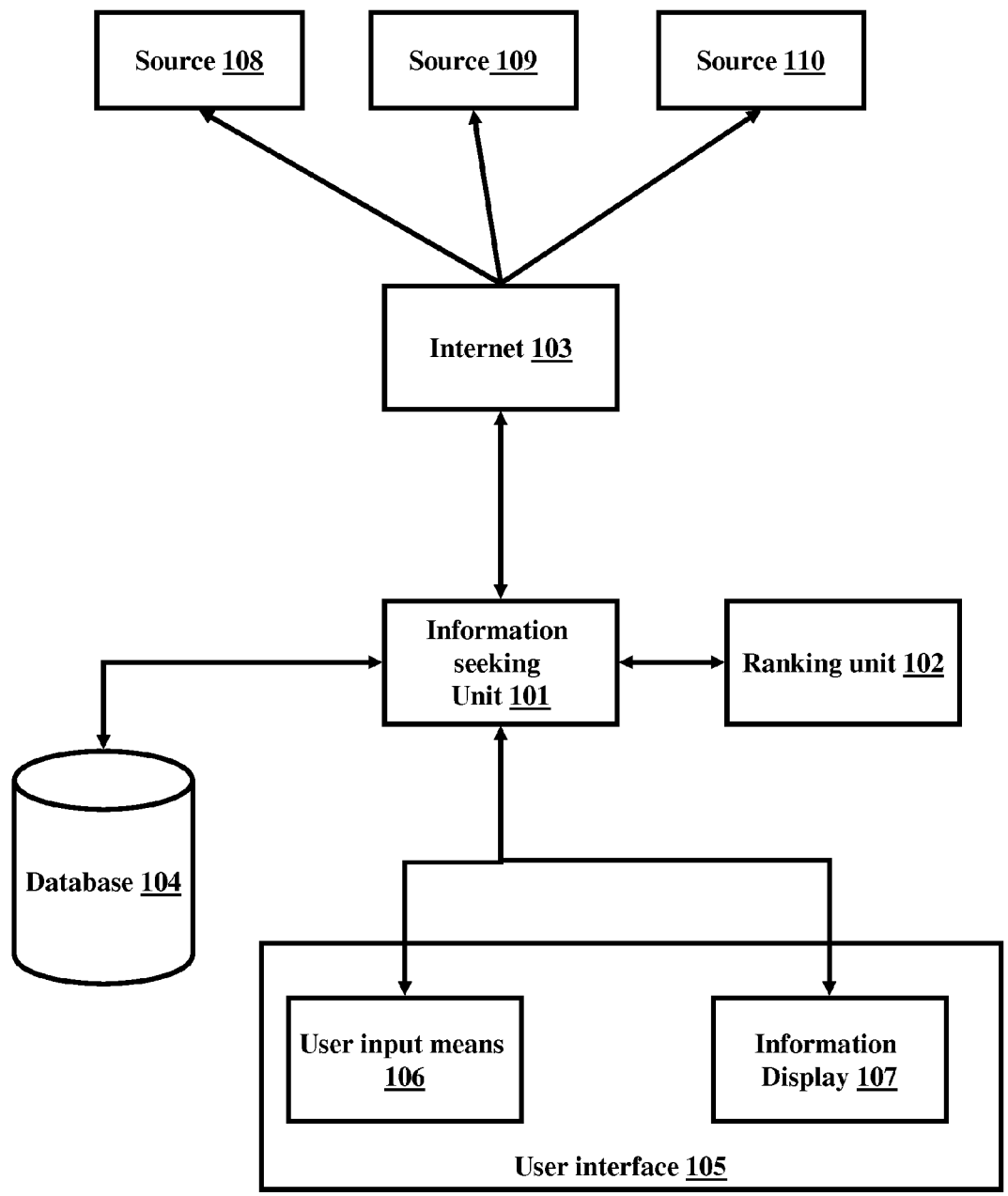
FIG. 1 illustrates elements of a system, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method and system for finding information about an individual by searching the Internet, internal database records, desktop search, deep web search and the like. Referring now to the drawings, and more particularly to FIGS. 1 through 16, where similar reference characters denote corresponding features consistently throughout the figures, there are shown embodiments.

Disclosed herein is a method and system for a user to find an email address using the Internet. The Internet refers to official websites run by companies, social networking sites, sites relying on user generated context, professional listings and so on. In addition, a search can be performed in internal proprietary databases. The internal database can include contact details of people engaged in business with the proprietor, which are not available on the Internet.

The user inputs information and may manually indicate the fields in the information that he wants to be verified or updated or completed. The user may input information using any input means like a keyboard, mouse, touch screen display, a scanner and so on. The information input by the user may be an entry in an address book, which comprises of fields like name, residential phone number, official phone number, cellular phone number, email address, office address, residential address, fax number and so on. The information input by the user may also be an address book, comprising of multiple entries, where each entry further comprises of fields like name, residential phone number, official phone number, cellular phone number, email address, office address, residential address, fax number and so on.

If the user has not indicated any fields in the information that he wants to be verified or completed, then a seeking unit determines if any fields in the information are absent or incorrect by performing parsing. Parsing analyzes the fields present in the information and identifies the nature of information present in the fields. If there is no information present in the field or the information present in the field is determined to be incorrect, then the seeking unit determines that a search needs to be performed for information that can be populated into these fields. For example, the seeking unit parses the information and detects that information present in the email address field is incorrect. This may be done, for example, by looking for the presence of "@", "(at)" or "at" indicated in the email address with leading and trailing spaces and the like in the email address field. If the "@" character is absent, then it can be assumed that the entry in the email address field is incorrect and a search needs to be performed for the correct email address.

The seeking unit may search for email address related information from various sources on the Internet. The seeking unit may also look for email address information based on rules. The rules may be specified by the user. The rules may also be extracted from a database comprising of known rules to generate required email address information.

The email address information that has been found is ranked by a ranking unit. The ranking unit ranks the email address information on the basis of factors like credibility of the source of information, verification from one or more independent sources, relevance of the information and source. The ranking may be done on a per source basis; where various results found from a single source are ranked based on factors like relevance and so on. The ranking may also be done across all the sources of information, where all the results from all the sources are ranked.

If email address information is searched both from various sources and also based on rules, then the seeking unit, with the help of the ranking unit co-relates the results and ranks them. The ranking unit ranks the email address information on the basis of factors like credibility of the source of information, verification from one or more independent sources, relevance of the information and source. In addition, the extent of name match with the input name, company match with the company email address pattern, domain match with the email address domain of the company and so on are also considered during the ranking process by the ranking unit.

The seeking unit may populate the email address information found into the relevant field, with the lowest ranked email address information being used to populate the field. The seeking unit may also display the found email address information along with the ranks to the user. The user has the option to sort the email address information, based on ranking, alphabetical order, source and so on. The user can also define a set of rules for ranking, the rules can be pre configured in the ranking unit. The user may then select the most accurate email address information, according to him, which is then used to populate the field in the information.

FIG. 1 illustrates elements of a system, according to embodiments disclosed herein. The system comprises of a user interface 105, a seeking unit 101, a ranking unit 102 and a database 104. The user interface 105 further comprises of a user input means 106 and an information display 107. The user input means 106 could be any suitable means for the user to input information, like a keyboard, mouse, touch screen display, a scanner and so on. The user uses the user input means 106 for inputting information. The information input by the user may be an entry in an address book, which comprises of fields like name, residential phone number, official phone number, cellular phone number, email address, office address, residential address, fax number and so on. The information input by the user may also be an address book, comprising of multiple entries, where each entry further comprises of fields like name, residential phone number, official phone number, cellular phone number, email address, office address, residential address, fax number and so on. Some fields in the email address information may be left blank, as the user is not aware of the accuracy of the information to be entered into the field or he is not aware of the information. The user may also use the user input means to indicate any specific field in the information that he wants to be found or updated or verified.

The seeking unit 101 on receiving the email address information such as first name, nick name, last name or domain name of the company, company name etc from the user via the user input means 106, checks if the user has indicated any specific field of information that the user would like to search in the email address. If the user has not specified any field to search for, then the seeking unit 101 parses the email address information received from the user to determine if any fields in the information are absent or incorrect. If there is no information present in the field or the information present in the field is determined to be incorrect, then the seeking unit 101 determines that a search needs to be performed for information that can be populated into these fields.

The seeking unit 101 also provides reverse email look up feature i.e. provided an email address, the seeking unit can provide the name details of the person such as first name, last name so on based on the email address pattern. Also, the name of the company and domain details can be extracted from different email address patterns provided by the user to the seeking unit 101.

The seeking unit 101 further checks, if the user has specified a process of searching for email address information. The user may select any one of the available processes for finding information. He may also select multiple processes simultaneously for finding out the information. If the user has not specified any process, the seeking unit 101 selects a suitable process, based on the type of information to be found.

A first process for finding out information involves the seeking unit 101 using configured sources 108, 109, 110 for the email address information. A list of sources 108, 109, 110 may be configured by users and stored in the database 104. The user may also specify potential sources 108, 109, 110 of information. If the seeking unit 101 identifies a source of information which gives relevant results, the seeking unit 101 may update the database 104 with this source of information automatically.

A second process for finding out the email address information involves the seeking unit 101 generating the information based on certain rules, which are stored in the database. The rules may be generated by the seeking unit 101 using an indexing process and pattern generation. Indexing process involves verification of certain rules. For example, the email address patterns for a particular company could be built on some rules specific to the company. Email address could be statically stored on some internal repositories maintained by the companies or dynamically generated from a given list of email addresses for a particular company. The indexing process further comprises of manual verification of data and the rules. The seeking unit 101 could detect and generate a specific email address pattern that is used by a company for generating email address for its employees. The company could use firstname_lastname@company.com as a general rule for generating email address for its employees. So, if a search is conducted for the email address of an employee of this company, then the seeking unit 101, based on the pattern specific to this company stored in the database 104, will suggest the email address as firstname_lastname@company.com to the user as the most probable email address.

The seeking unit 101 generates results and sends the results to the ranking unit 102. The ranking unit 102, on receiving the results, assigns a relevance score based on priority of the source, credibility and relevance. The ranking unit 102 decides on the relevance score based on an already pre-defined priority of a source. The relevance score may be in terms of a percentage value. The pre-defined priority is generated statistically using test results. The user may also assign a high priority to a particular source of information. If the seeking unit 101 has performed the search using multiple processes, then the ranking unit 102 receives multiple sets of results from the seeking unit 101. The results from the multiple processes are correlated before assigning relevance scores to the results. The ranking unit 102 ranks the results, based on the relevance scores. The result with the highest relevance score will get the highest numerical rank, with results with lower relevance scores receiving lowest numerical ranks. The relevance scores are calculated by assigning weights for each factor that matches the email address such as a direct correlation between Name and the user name in the email address, a match between domain of the email address with the web domain of company, company name found in source of email address, contact name found in source of email address, pattern of the company matches pattern of email address and so on. All weights are summed to get the exact email address weight. In an example, consider an email address with an exact weight of 75, the email address has a very high relevancy score and is considered the best email match for the contact by giving it a high ranking of 5. Email addresses with lower relevancy score between 50 and 75 are given a ranking of 4. Email addresses with still lower relevancy score between 50 and 30 are given a ranking of 2. The ranking unit 102 sends the ranked results to the seeking unit 101.

The seeking unit 101, on receiving the ranked results from the ranking unit 102, may display the results, in terms of their ranks and relevance scores to the user using the information display 107. The seeking unit 101 may be configured to select the lowest ranked result and populate the result into the information field automatically. The user may also configure the seeking unit 101, so that if the relevance score has only one result above a certain score, then the field gets automatically populated with the result. If there are multiple results above a certain score, then the results are displayed to the user, so the user may select the closest result. The result selected by the user is populated into the email address field in the information.

The seeking unit 101 and the ranking unit 102 are separate computing systems, which communicate through a Local Area Network (LAN), Wide Area Network (WAN) or any other suitable means. The seeking unit 101 is also connected to the database 104 through a Local Area Network (LAN), Wide Area Network (WAN) or any other suitable means.

As an illustration, consider a number of people, who have computing systems which are configured for searching for email addresses and predicting email addresses, effectively functioning as a plurality of seeking units 101. The seeking units 101 are connected to a central ranking unit 102. The seeking units 101 fetch results and rules from a central database 104 through a suitable communication means. For example, if the seeking units 101 and the database 104 are located in the same building block, then the seeking units 101 and the database 104 may communicate using a LAN. If the seeking units 101 and the database 104 are located a few miles away, then the seeking units 101 and the database 104 communicate using a WAN. The seeking units 101 on obtaining results, if required sends the results to the ranking unit 102 through a suitable communication means. The remote ranking unit 102, after performing the ranking for the email addresses, sends the ranked results to the seeking unit 101. For example, if the seeking unit 101 and the remote ranking unit 102 are located in the same building block, then the seeking unit 101 and the remote ranking unit 102 may communicate using a LAN. If the seeking unit 101 and the remote ranking unit 102 are located a few miles away, then the seeking unit 101 and the remote ranking unit 102 communicate using a WAN.

Figure 2:
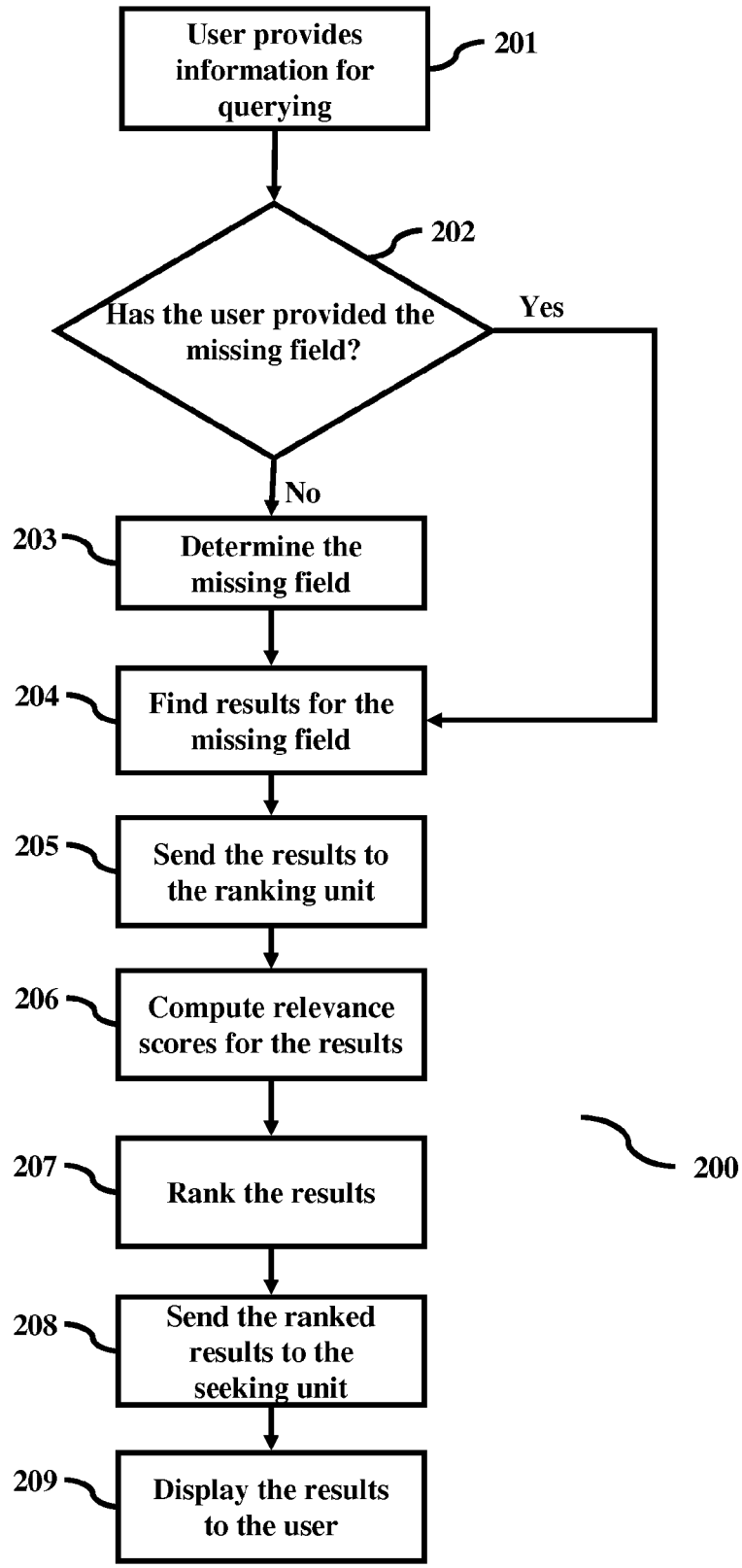
FIG. 2 is a flowchart depicting a process for finding information, according to embodiments disclosed herein.

FIG. 2 is a flowchart depicting a process for finding information, according to embodiments disclosed herein. The user provides (201) email address information to the seeking unit 101. The user uses the user input means 106 for providing the information to the seeking unit 101. The user input means 106 could be any suitable means for the user to input information, like a keyboard, mouse, touch screen display and so on. The information input by the user may be an entry in an address book, which comprises of fields like name, residential phone number, official phone number, cellular phone number, email address, office address, residential address, fax number and so on. The information input by the user may also be an address book, comprising of multiple entries, where each entry further comprises of fields like name, residential phone number, official phone number, cellular phone number, email address, office address, residential address, fax number and so on.

The seeking unit 101, on receiving the email address information from the user, checks (202) if the user has indicated the field of information that he wants to be found or verified. The seeking unit 101 may do this by checking for any fields in the email address that are left blank. The user has left the field blank, as the user may not be aware of the accuracy of the information to be entered into the field or he is not aware of the information. The field as specified by the user could be the email address of a person, residential phone number of a person, official phone number of a person, cellular phone number of a person, office address of a person, residential address of a person, fax number of a person and so on.

If the user has not specified any field to search for in the email address, then the seeking unit 101 determines (203) the field to search for, by parsing the information received from the user to determine if any fields in the information are absent or incorrect. If there is no information present in the field or the information present in the field is determined to be incorrect, then the seeking unit 101 determines that a search needs to be performed for information that can be populated into these fields.

Once the seeking unit 101 determines the field of information to be searched in the email address, the seeking unit 101 performs (204) a search. The seeking unit 101 searches for the information using a suitable process, where the process is selected based on the type of information to be found. The seeking unit 101 may also use multiple processes, which run simultaneously to find the information. The user may also select any one of the available processes for finding information. He may also select multiple processes simultaneously for finding out the information.

Once the seeking unit 101 finds or generates results, the seeking unit 101 sends (205) the results to the ranking unit 102. The seeking unit 101 and the ranking unit 102 may be connected to the same local network or could be connected using any suitable mode of communication. The results received by the ranking unit 102 are broadly sorted according to the process used by the seeking unit to generate the information. The number of sets of results will be equal to the number of processes used by the seeking unit 101 to get the results. Within each set, the results may be further classified according to the source of the results.

The ranking unit 102, on receiving the results, computes (206) a relevance score based on priority of the source, credibility, relevance and user preferences. The relevance score may be in terms of a percentage value. The ranking unit 102 decides on the relevance score based on an already pre-defined priority of a source. The pre-defined priority is generated statistically using test results. As an illustration, the user may define a rule for ranking an email address that includes nick name and/or first name in the email address. The email address with nick name, last name, and first name is ranked higher than the email address with only first name or nick name or last name. The user may also assign a high priority to a particular source of information. The results from the multiple processes are correlated before assigning relevance scores to the results.

The ranking unit 102 ranks (207) the results, based on the relevance scores. The result with the highest relevance score will get the highest numerical rank, with results with lower relevance scores receiving lowest numerical ranks. Ranking is done across the multiple sources of information and multiple processes.

Once the ranking unit 102 has ranked the results, the ranking unit 102 sends (208) the ranked results to the seeking unit 101. The seeking unit 101 sends (209) the ranked results to the information display 107 for display to the user.

The various actions in method 200 may be performed in the order presented, in a different order or simultaneously. Further, in some embodiments, some actions listed in FIG. 2 may be omitted.

Figure 3:
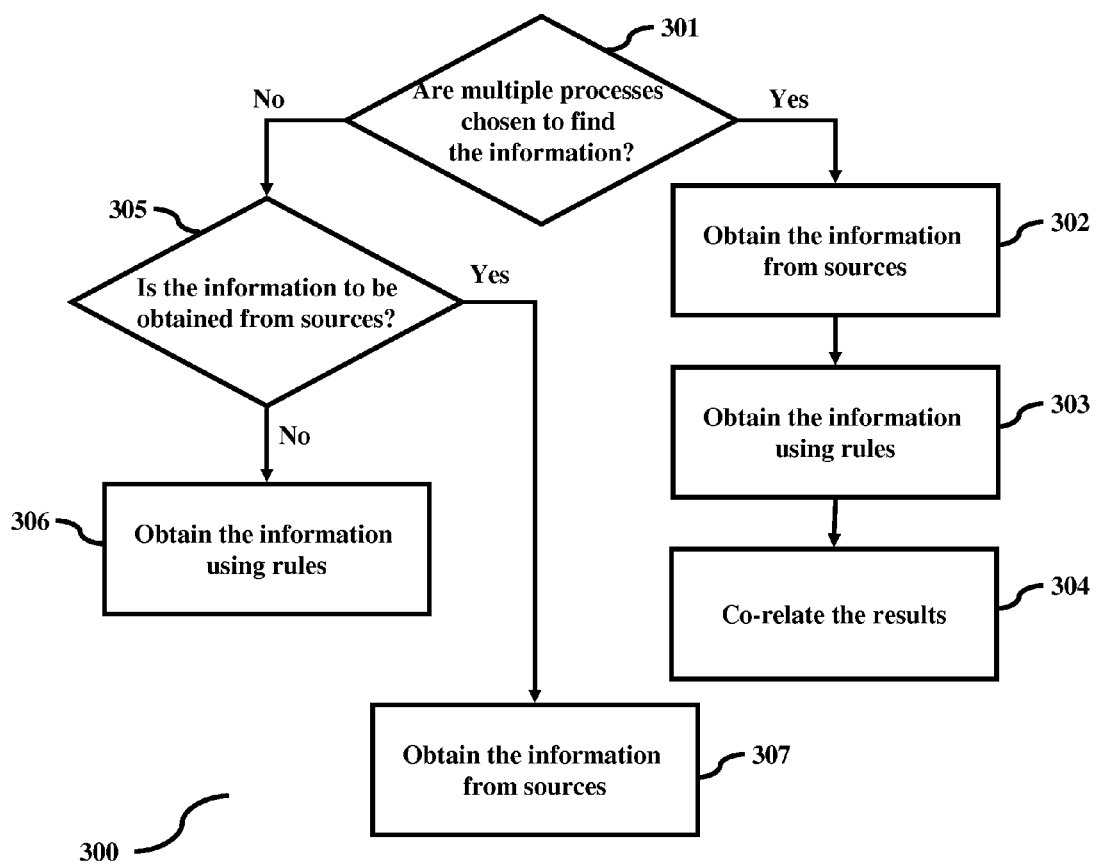
FIG. 3 is a flowchart depicting a process for finding information using a specified method, according to embodiments disclosed herein.

FIG. 3 is a flowchart depicting a process for finding information using a specified method, according to embodiments disclosed herein. Once the seeking unit 101 has determined the email address information to be searched, the seeking unit 101 determines the process to be followed for obtaining the email address information. The seeking unit 101 determines the process to be followed based on the information to be found. The user may also specify a process of searching for email address information. The user may select any one of the available processes for finding information. He may also select multiple processes simultaneously for finding out the information.

The seeking unit 101 checks (301) if more than one process has to be followed to obtain the information.

If only one process has been specified, the seeking unit 101 performs (305) a further check to see which process has to be used.

If the seeking unit 101 has to obtain the information using various sources, then the seeking unit 101 uses (307) configured sources for the information. A list of sources may be configured by users and stored in the database 104. The user may also specify potential sources of information. If the seeking unit 101 identifies a source of information which gives relevant results, the seeking unit 101 may update the database 104 by adding this source of information automatically.

If the seeking unit 101 does not have to obtain the email information using various sources, then the seeking unit 101 generates (306) the address information based on certain rules, where the rules are stored in the database 104. The rules may be generated by the seeking unit 101 using an indexing process and pattern generation. For example, the seeking unit 101 could detect and generate a specific address pattern that is used by a company for generating email address for its employees. The company could use firstname_lastname@company.com as a general rule for generating email address for its employees. So, if a search is conducted for the email address of an employee of this company, then the seeking unit 101, based on the pattern specific to this company stored in the database 104, will suggest firstname_lastname@company.com as the most probable email address to the user.

If more than one process is needed to obtain the information, the seeking unit 101 may first use (302) configured sources for the information. A list of sources may be configured by users and stored in the database 104. The user may also specify potential sources of information. If the seeking unit 101 identifies a source of information which gives relevant results, the seeking unit 101 may update the database 104 with this source of information automatically.

Then, the seeking unit 101 generates (303) the information based on certain rules, which are stored in the database. The rules may be generated by the seeking unit 101 using an indexing process and pattern generation. For example, the seeking unit 101 could detect and generate a specific address pattern that is used by a company for generating email addresses for its employees. The company could use firstname_initial_lastname@company.com as a general rule for generating email address for its employees. So, if a search is conducted for the email address of an employee of this company, then the seeking unit 101, based on the pattern specific to this company stored in the database 104, will suggest firstname_initial_lastname@company.com as the most probable email address to the user.

Steps 302 and 303 may be performed simultaneously or the order of steps may be switched.

Once the results have been obtained using multiple processes, then the seeking unit 101 sends the results to the ranking unit 102. The ranking unit performs (304) correlation on the results obtained from the processes.

The various actions in method 300 may be performed in the order presented, in a different order or simultaneously. Further, in some embodiments, some actions listed in FIG. 3 may be omitted.

Figure 4:
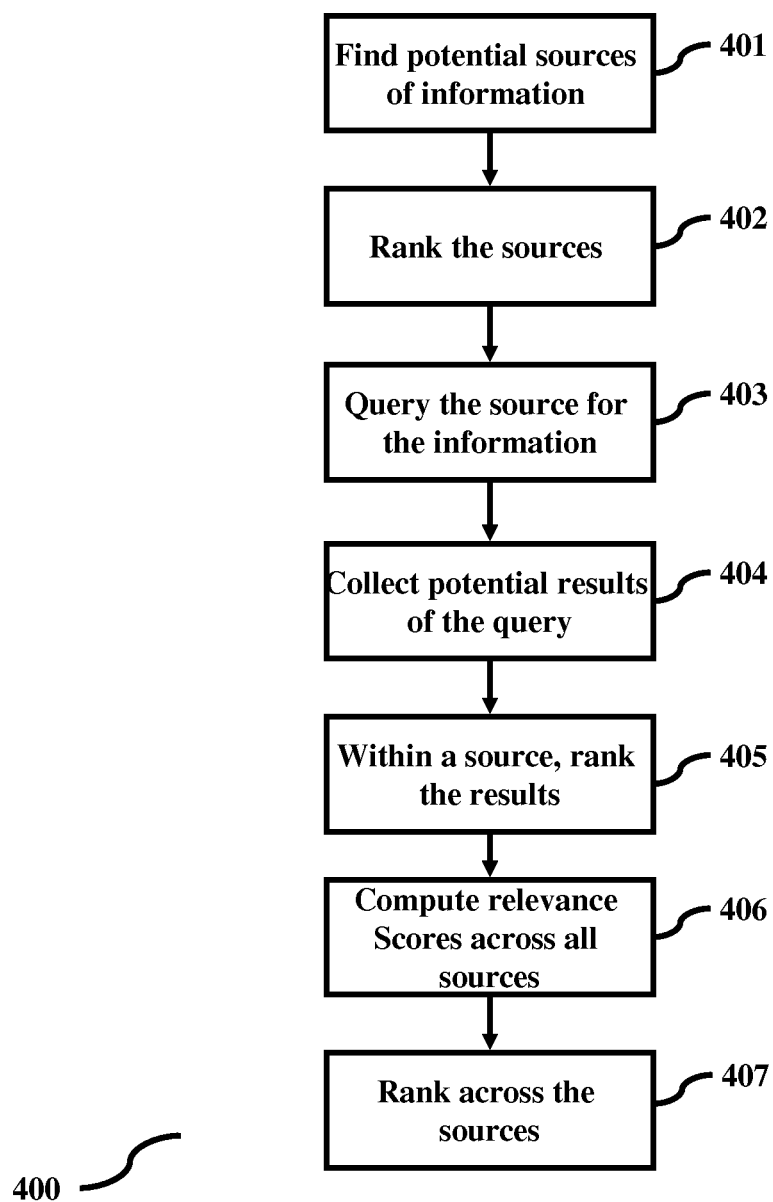
FIG. 4 is a flowchart depicting the process for collecting information from various sources, according to embodiments disclosed herein.

FIG. 4 is a flowchart depicting the process for collecting information from various sources, according to embodiments disclosed herein. Once the seeking unit 101 determines the information to be obtained, the seeking unit 101 finds (401) potential sources of information on the Internet 103. The sources of information could be official websites run by companies, social networking sites, sites relying on user generated context, professional listings and so on. Information can also be obtained through API's form third party repositories. Third party repositories can include internal databases maintained by companies, business directories and the like. The user may also specify some sources such as resume portals or job banks available on the Internet, where the sources may contain the email address of a person. The seeking unit 101 may also check the database 104, which may contain a list of potential sources. If the seeking unit 101 identifies a source of information which gives relevant results, the seeking unit 101 may update the database 104 with this source of information automatically. The database 104 may also be updated by a user using user interface 105.

The seeking unit 101 ranks (402) the sources, based on the relevance of the source, reliability and credibility of the source. The reliability and credibility of the source depends on past searches that have been performed. A source may have high reliability and credibility, if the source had information which got a high relevance score or had been selected by a user as the correct information. This data about the reliability and credibility of a source is stored in the database 104. The seeking unit 101 fetches this data when required from the database 104.

The seeking unit 101 queries (403) the source. The sources may be queried in order of ranking of the sources. The query may be sent to the source present on the Internet using a suitable mode of communication like a wireless network or a wired network.

The seeking unit 101 collects (404) results from the sources. The sources present on the Internet may send the queries to the seeking unit 101 using a suitable mode of communication like a wireless network, or a wired network.

The seeking unit 101 sends (405) the results to the ranking unit 102. The seeking unit 101 and the ranking unit 102 may be connected to the same local network or could be connected using any suitable mode of communication.

Once the ranking unit 102 receives the results, the ranking unit ranks (406) the results on a source by source basis. If a source has given multiple results, then the ranking unit 102 ranks all the results given by that particular source.

The ranking unit 102 computes (406) a relevance score based on priority of the source, credibility and relevance across all sources. The ranking unit 102 decides on the relevance score based on an already pre-defined priority of a source. The relevance score may be in terms of a percentage value. The pre-defined priority is generated statistically using test results. The priority of a source can be assigned by confirming the email address details like the name, company website, and email domain of the company and so on. The user may also assign a high priority to a particular source of information.

The ranking unit 102 also provides ratings to the email addresses based on other factors such as type of name match in the email address, wherein the user name in the given email address is matched with the database for comparison. Name match can consider factors such as full name match, partial name match, substring match in the name, initials match or given name and another name match, name and company match etc.

For illustration, consider the email address chandra.bopati@company.com is matched with the search results; the email address is given a rating of say 5, if there is a partial name match or full name match of the user name of the address without any extra characters. In another illustration, if an email domain matches the company domain or its personal domain and satisfies the matches of full name, partial name etc of the user name of the email address without any extra characters, but the company name is not found in the source, then a rating of 5 may be given.

A rating of 4 may be given to an email address, if the email domain matches company domain or the personal domain but the company name is found in the source, but there is no partial name match or full name match of the user name of the email address.

In a similar fashion, ratings are assigned to different email addresses based on conditions satisfied by the email addresses.

The ranking unit 102 ranks (407) the results, based on the relevance scores and the ratings. Ranking unit 102 filters the email addresses based on the closeness of the email addresses to the name and company details of the person input by the user. Results are filtered within a source and also across multiple sources, based on the name and company details of the person input by the user. The result with the highest relevance score will get the highest numerical rank, with results with lower relevance scores receiving lower numerical ranks. The ranking is done across the multiple sources of information.

Once the ranking unit 102 has ranked the results, the ranking unit 102 sends (408) the ranked results to the seeking unit 101. On receiving the ranked results from the ranking unit 102, the seeking unit 101 sends (409) the ranked results to the information display 107 for display to the user.

The various actions in method 400 may be performed in the order presented, in a different order or simultaneously. Further, in some embodiments, some actions listed in FIG. 4 may be omitted.

Figure 5:
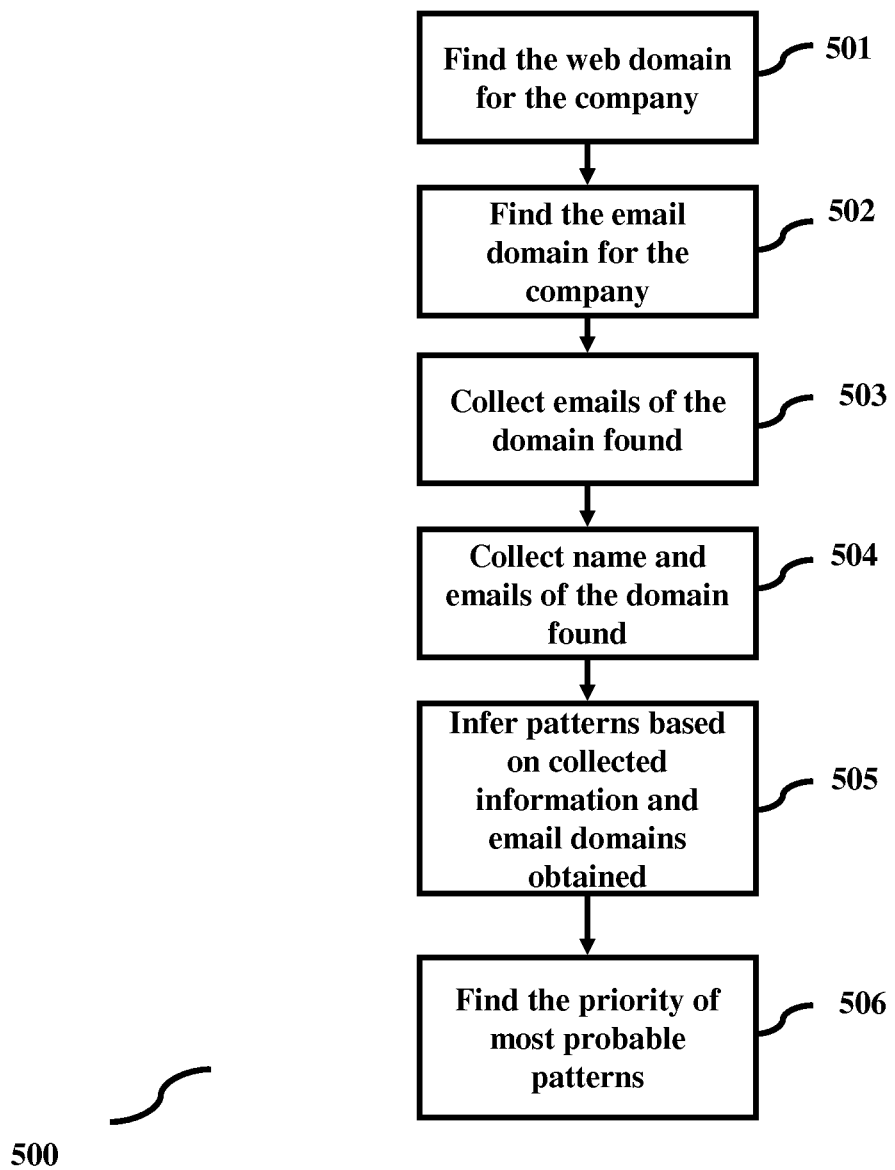
FIG. 5 is a flowchart depicting the process of finding a pattern in an email address, according to embodiments disclosed herein.

FIG. 5 is a flowchart depicting the process of finding a pattern in an email address, according to embodiments disclosed herein. The email address patterns for an individual or a company in an email address can be obtained programmatically. As an illustration, consider that the email patterns for a company are to be obtained. First, the web domain of the company is obtained (501). In order to obtain the web domain of the company, search is performed on different Internet sites. A search may be done by using different queries according to the requirements and the information available. Search may be performed on different sites such as Google, Yahoo, social networking sites or on online business directories.

A company can have different forms of web domains and email domains such XYZ@company.com, XYZ@company.co.uk and the like. A company may have multiple website domains that seem to match with the company name such as constructioncompany.com or constructioncompanygroup.com and so on. Abbreviation of the company names such as ccg.com and the like are also matched with the results obtained from different Internet search sites, to find the website details of the company. Email addresses could also be obscured such as 'at' instead of '@'. In such cases, the information available from various sources is matched for different patterns to aggregate email addresses. Algorithms are also used for matching the company name with search results to correlate company name and website.

Once the web domain of the company is obtained, the next step is to obtain (502) the email domain of the company. Email domain may identify a part of the company name that is unique. For example, in an email address with the pattern firstname.lastname@dept.companyname.com, the companyname.com is the website of the company that is common for all employees, whereas the dept is the department name that may vary according to the department of the employee. An email address includes two fields, the first part that comes before the '@' is a field specific to a user and the second part after '@' is generally the company name. The second part constitutes the email domain and can be in the form of companyname.org, companyname.com, companyname.in and the like. Different patterns such as firstname_lastname, lastname_firstname etc can be used for a given email domain.

A personal email domain database known as UnknownDb, which comprises of a list of personal email domains such as gmail.com, comcast.com, hotmail.com and so on, is used to eliminate personal email addresses.

Further, the number of email address under each email domain is collected (503). As an example, if the company has three different email domains, such as product.com, product.co.in, product.org, the email addresses under each of the three domains are obtained. Email addresses belonging to different email domains are stored separately.

The obtained list of email domains is used to obtain (504) the user name and number of email addresses under each email domain. As an example, the number of email addresses in product.com and product.co.in are stored separately. In addition, the names under each email domain is also collected and stored. In case of patterns such as firstname.lastname@company.com or lastname.firstname@company.com, firstname.lastname and lastname.firstname are identified as different email address patterns belonging to the same email domain company.com and stored separately.

The collected information on email address patterns is analyzed (505). During the analysis, a record of different possible patterns of the email address is made. From the recorded data, the email domain patterns and user name patterns are identified. In case, we obtain more than one email domain for a site during the search, based on the obtained details, we can generate email address patterns for all email domains.

On the basis of the analysis done on the patterns of the user names and email addresses, priority is assigned (506) to different email address patterns. The email address pattern with the maximum number of occurrences is assigned the highest priority and priority decreases with a decrease in the number of occurrences. The email address pattern with the highest priority is chosen as the most probable email address. The various actions in method 500 may be performed in the order presented, in a different order or simultaneously. Further, in some embodiments, some actions listed in FIG. 5 may be omitted.

Figure 6:
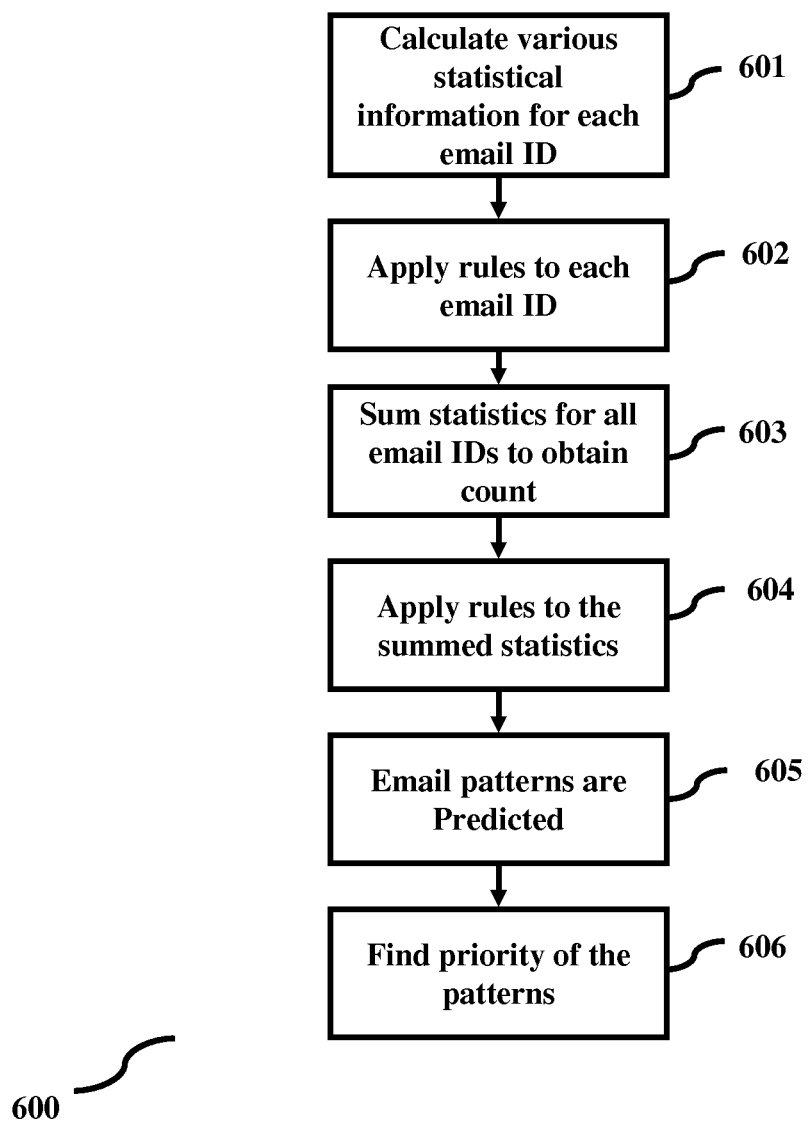
FIG. 6 is a flowchart depicting the process of finding a pattern for an email address given email addresses, according to embodiments disclosed here.

FIG. 6 is a flowchart depicting the process of finding a pattern for an email address given email addresses, according to embodiments disclosed herein. Consider the case, where the email address of a person is known and we need to find the company details from the available information. The user inputs multiple email addresses using the input means 106. By analyzing the details of the multiple email addresses, different statistics are obtained (601) for each of the email addresses. Statistical details include finding the alphabet count in the email address. For example, in an email address of the form firstname.lastname@yahoo.com, the number of characters in the email address is obtained. The numericals present in the email address are also counted and designated as number count. In case of the email address not comprising any numericals, the number count is taken as zero. A first name database stores the first names in the email address. During the process of pattern matching, only the first names present in the first name database are compared for pattern mapping. Similarly, a last name database stores the last names in an email address. A separator count makes a record of the any special characters in the user name such as . (dot), _ (underscore), - (hyphen) and the like. In case the user name does not include any special characters, the count is stored as zero. For example, in an email address of the form firstname.lastname@yahoo.com, the first name database stores the firstname, while the last name database stores the lastname and the separator count is one (.).

Nick name database stores the nick names in the email address. For example in an email address, jeff.jeffery@yahoo.com, jeff indicates a nick name. In order to eliminate general email addresses such as information, sales etc, a known/unknown database is employed.

The Known/Unknown database lists words such as contact, sales, marketing, hr and so on, which cannot be linked to a specific person, but to a department in a company. In addition, consonant count at the start position of an email address is recorded in the statistical information. The obtained statistical details are stored in the database 104 for each pattern of the email address.

Subsequent to obtaining statistical information, rules are defined and applied (602) for each email address. The rules may be predefined set of rules or they may be modified as per the current requirements. As an example, one rule could check if there are two consonants at the starting of the email address. In case the email address satisfies the rule, the email address is grouped under a particular pattern. Any other email address which satisfies the same rule will be categorized in the same pattern and the count can be incremented. Other rules may be also used like vowel count and so on.

Once the rules are defined and applied for each email address, statistics for each of the different patterns of email address are summed (603) to obtain counts. The process can involve identifying the most common statistical information for all the patterns of email addresses. The most common statistical information could be the alphabet count, number count, first name count and so on. For each email address, these summed counts are used in the rules to find different patterns of email addresses. The patterns, which are of a similar type, are summed to get high and low probability patterns. Based on the probability patterns, probable email addresses can be ranked.

Once the counts are obtained, the counts are used (604) in the rules to sum up similar patterns. Rules can check for the alphabet count, numeric count, vowel count and the like.

Once the similar email address patterns are summed, email addresses are predicted (605) on a search query being entered by a user. When a search query is entered for finding an email address, different patterns are analyzed and mapping is performed for different patterns. The collected information on email address patterns is analyzed. During the analysis, a record of probable patterns of the email address is made. For example, if a query with the last name is entered, email address patterns with last name are searched.

Upon predicting email address patterns, priority is assigned (606) to the probable address patterns. The email address pattern with the maximum number of occurrences is assigned the highest priority and priority decreases with decrease in the number of occurrences. The most probable pattern (i.e. the pattern with the highest priority) is chosen. The various actions in method 600 may be performed in the order presented, in a different order or simultaneously. Further, in some embodiments, some actions listed in FIG. 6 may be omitted.

Figure 7:
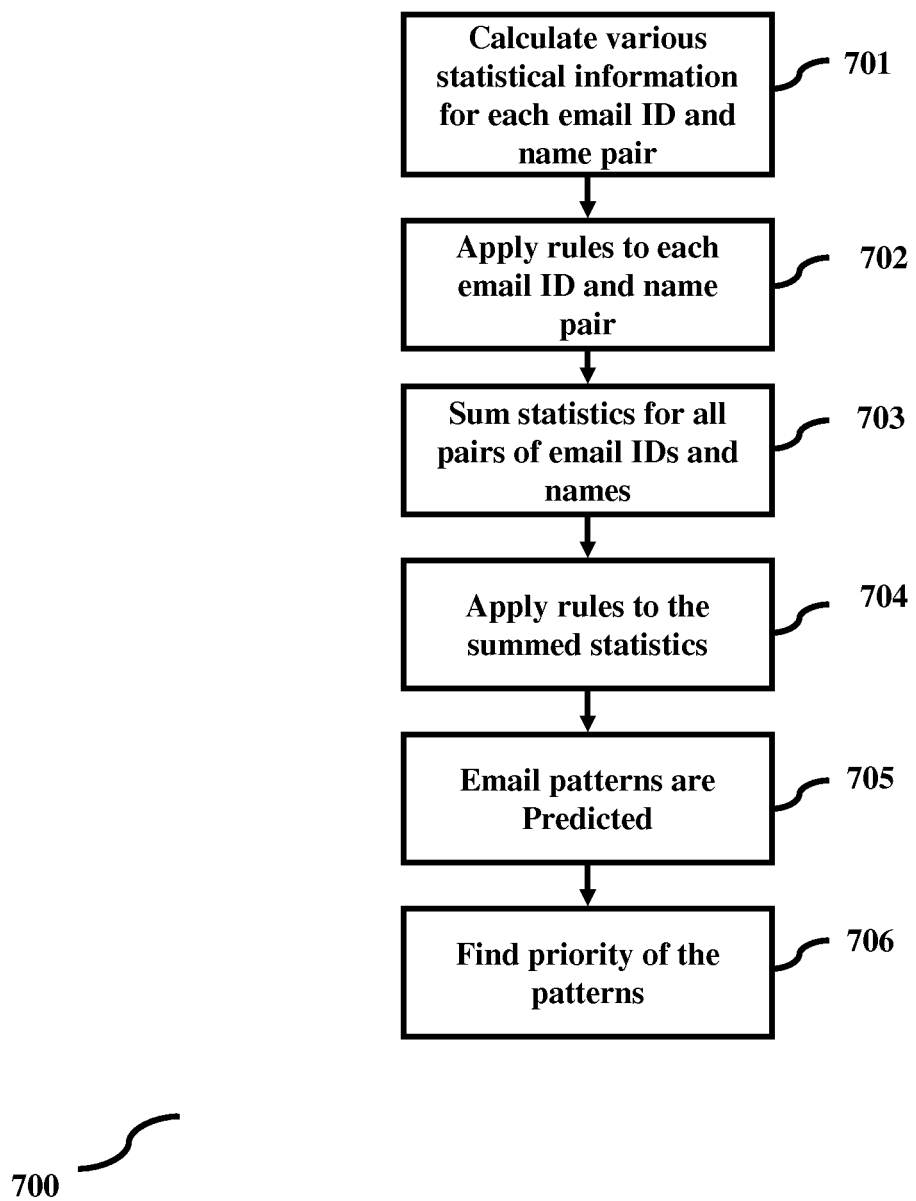
FIG. 7 is a flowchart depicting the process of finding a pattern for email addresses given email address and name, according to embodiments disclosed herein.

FIG. 7 is a flowchart depicting the process of finding a pattern for email addresses given email address and name, according to embodiments disclosed herein. Consider the case where the name and email address of a person in a particular domain of a company is known and the company details need to be found from the available information. The user inputs multiple email addresses and name pair using the input means 106. By analyzing the details of the multiple email addresses, different statistics are obtained (701) for each of the email addresses and name pair. Statistical details include finding the alphabet count in the email address. For example, in an email address of the form firstname.lastname@yahoo.com, the number of characters in the email address is obtained. The numericals present in the email address are also counted and designated as number count. In case of the email address not comprising any numericals, the number count is taken as zero. A first name database stores the first names in the email address. During the process of pattern matching, only the first names present in the first name database are compared for pattern mapping. Similarly, a last name database stores the last names in an email address. A separator count makes a record of the any special characters in the user name such as . (dot), _ (underscore), - (hyphen) and the like. In case the user name does not include any special characters, the count is stored as zero. For example, in an email address of the form firstname.lastname@yahoo.com, the first name database stores the firstname, while the last name database stores the lastname and the separator count is one (.).

Nick name database stores the nick names in the email address. For example in an email address, jeff.jeffery@yahoo.com, jeff indicates a nick name. In order to eliminate general email addresses such as information, sales etc, a known/unknown database is employed.

The Known/Unknown database lists words such as contact, sales, marketing, hr and so on, which cannot be linked to a specific person, but to a department in a company. In addition, consonant count at the start position of an email address is recorded in the statistical information. The obtained statistical details are stored in the database 104 for each pattern of the email address.

Subsequent to obtaining statistical information, rules are defined and applied (702) for each email address and name pair. The rules may be a predefined set of rules or they may be modified as per the current requirements. As an example, one rule could check if there are two consonants at the starting of the email address. In case, the email address satisfies the rule, the address is grouped under a particular pattern. Any other email address which satisfies the same rule will be categorized in the same pattern and the count can be incremented. Other rules may be also used like vowel count and so on.

Once the rules are defined and applied for each email address, statistics for each of the different patterns of email address are summed (703) to obtain counts. The process can involve identifying the most common statistical information for all the patterns of email addresses. The most common statistical information could be the alphabet count, number count, first name count and so on. For each email address, these summed counts are used in the rules to find different patterns of email addresses. The patterns, which are of a similar type, are summed to get high and low probability patterns. Based on the probability patterns, probable email addresses can be ranked.

Once the counts are obtained, the counts are used (704) in the rules to sum up similar patterns. Rules can check for the alphabet count, numeric count, vowel count and the like.

Once the similar email address patterns are summed, email addresses are predicted (705) on a search query being entered by a user. When a search query is entered for finding an email address, different patterns are analyzed and mapping is performed for different patterns. The collected information on email patterns is analyzed. During the analysis, a record of probable patterns of the email address is made. For example, if a query with the last name is entered, email address patterns with last name is searched.

Upon predicting email patterns, priority is assigned (706) to the probable email address patterns. The email address pattern with the maximum number of occurrences is assigned the highest priority and priority decreases with decrease in the number of occurrences. The most probable pattern (i.e. the pattern with the highest priority) is chosen.

The various actions in method 700 may be performed in the order presented, in a different order or simultaneously. Further, in some embodiments, some actions listed in FIG. 7 may be omitted.

Figure 8:
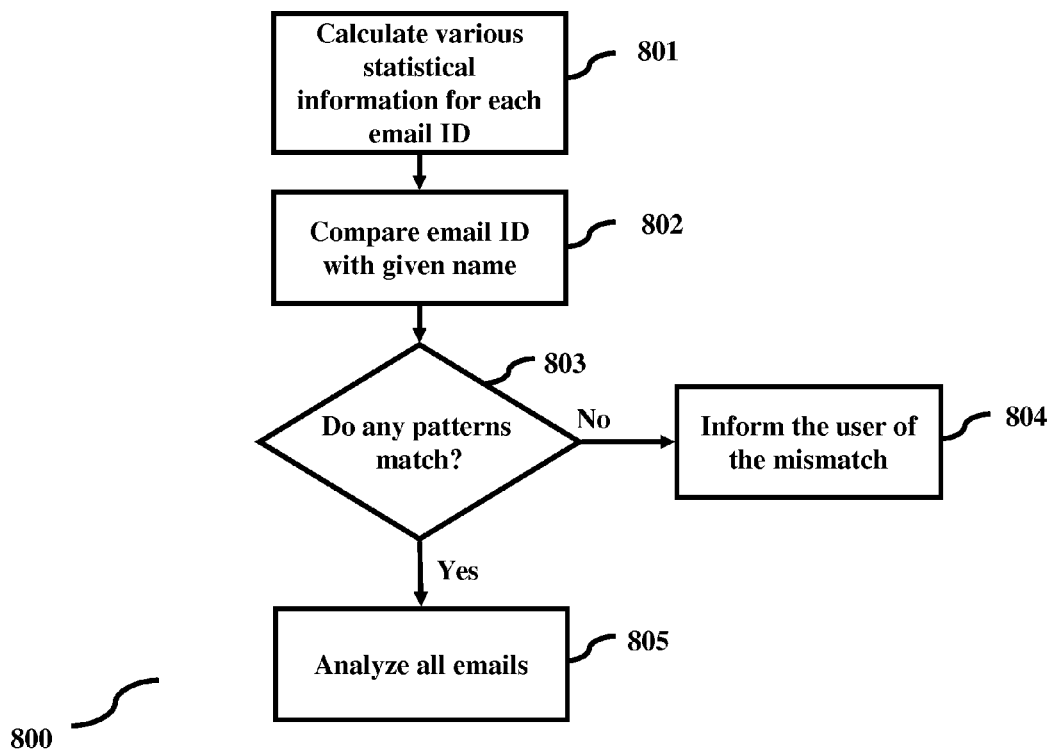
FIG. 8 is a flowchart depicting the process of finding an email address by analyzing an email address against a given name, according to embodiments disclosed herein.

FIG. 8 is a flowchart depicting the process of finding an email address by analyzing an email address against a given name, according to embodiments disclosed herein. Let us consider a case, where we know the name and email address of a person or a number of people working in a company. The user inputs multiple email addresses using the input means 106. By analyzing the details of the multiple email addresses, different statistics are obtained (801) for each of the email addresses. Statistical details include finding the alphabet count in the email address. For example, in an email address of the form firstname.lastname@yahoo.com, the number of characters in the email address is obtained. The numericals present in the email address are also counted and designated as number count. In case of the email address not comprising any numericals, the number count is taken as zero. A first name database stores the first names in the email address. During the process of pattern matching, only the first names present in the first name database are compared for pattern mapping. Similarly, a last name database stores the last names in an email address. A separator count makes a record of the any special characters in the user name such as . (dot), _ (underscore), - (hyphen) and the like. In case the user name does not include any special characters, the count is stored as zero. For example, in an email address of the form firstname.lastname@yahoo.com, the first name database stores the firstname, while the last name database stores the lastname and the separator count is one (.).

Nick name database stores the nick names in the email address. For example in an email address, jeff.jeffery@yahoo.com, jeff indicates a nick name. In order to eliminate general email addresses such as information, sales etc, a known/unknown database is employed.

The Known/Unknown database lists words such as contact, sales, marketing, hr and so on, which cannot be linked to a specific person, but to a department in a company. In addition, consonant count at the start position of an email address is recorded in the statistical information. The obtained statistical details are stored in the database 104 for each pattern of the email address.

Once the statistical details are calculated, compare (802) the user name of the email address with the given name. The name details are compared with the user name of the email address.

The given name and email address details of a person are then compared (803) with standard email patterns stored in the database 104. A comparison is made with the standard email address patterns to check if the given name and user name of the email address form any particular pattern which matches with any one of the standard patterns. As an illustration, the user name in an email address for a particular company could include first name of the employee, followed by a dot and then the last name of the employee. In another pattern followed by the company, the user name in the email address could be first name, followed by an underscore and then the last name of the employee.

As an example, if the given email address pattern is close to one of the standard patterns, where last name of the person is followed by an underscore and then the first name of the person, then the exact email address of the person is obtained. The email address in this example is in the form of lastname_firstname@yahoo.com e.g. galy_chris@yahoo.com.

In case the email address pattern does not match any of the standard email address patterns, the user who is searching for the pattern is informed (804) of the mismatch.

On the other hand, if the email address pattern matches any one of the standard email address patterns, all the email addresses in that particular pattern are analyzed (805). For example, if the email address pattern matches a pattern with the last name followed by an underscore and then the first name then, all the emails in that pattern are analyzed. From the analysis performed, the exact email address of the person can be obtained. The various actions in method 800 may be performed in the order presented, in a different order or simultaneously. Further, in some embodiments, some actions listed in FIG. 8 may be omitted.

FIG. 9 depicts a data structure for an email address provided the company name and alias name, according to embodiments disclosed herein. When a search is performed for an email address, a set of favorable results are obtained. Every email address found by searching is stored as an object of email class. Each email object has a number of member data fields for storage. The member data includes email object 901, which is a class of the object called email address. For each email address stored, a new class is created and the information on data members of each email address is stored in the class.

Email string 902 is a string which stores the count of the characters in the string. The total number of characters including spaces, underscores, period etc in the user name of the email address is stored in the email string 902. As an example, for the email address gary_gorge@yahoo.com, the count of the total string is ten including the underscore character.

Word count 903 stores the total number of words appearing in the email address. For example gorge-brown@yahoo.com the total number of words is stored as two. The special characters such as hyphen, underscore etc are excluded.

Email part array 904 is an array of email part objects, where each object stores the user name of the email address as separate words, where the words are separated by a separator. Each word in the user name is found by separating the user name when any one of the permitted separators will occur in the user name. The separators may be dot, hyphen and underscore. As an illustration, for the email address george.brown@yahoo.com, the separator is dot (.). The word is obtained by separating the email address at the dot. So, the user name comprises of two words, gorge and brown. The email part array 904 comprises of two words; gorge and brown.

Separator count 905 stores the total number of separators appearing in an email address. There are three separators commonly used, they are dot (.), hyphen (-) and underscore (_). Consider the email address black_jack_brown@yahoo.com, the total number of separators in the email address is two (underscores) thus, the separator count 905 comprises a value two.

Domain 906 indicates the domain of the email address. Different patterns of email addresses having similar domains are stored in the email domain 906 member. Example, gorge.gary@yahoo.com and gary.gorge@yahoo.com or gary.g@yahoo.com are all stored under the same domain.

Source of the email 907 stores a number indicating the source from where the email address is obtained. A source is assigned a unique number. For example, a source linkedin.com is assigned a number 3456. For an email address obtained from linkdin.com, source of the email 907 comprises of 3456.

Name 908 stores the total number of characters in the user name part of the email address. Name 908 includes both first name and last name of the user email address. For example, for an email address gorge.brown@yahoo.com, Name 908 will store a count of ten, which includes the first name and last name part of the user name of the email address.

First name 909 stores only the first name part of the user's email address. In an example, for the email address gorge.brown@yahoo.com, first name 909 stores only the first name of the user name i.e. gorge.

Last name 910 stores only the last name part of the user's email address. In an example, for the email address gorge.brown@yahoo.com, last name 910 stores only the last name of the user name i.e. brown.

Middle name 911 stores only the middle name of the user's email address. In an example, for the email address gorge.james_brown@yahoo.com, middle name 911 stores only the middle name of the user name i.e. james.

Exact email weight 912 denotes the closeness of the predicted email address to the email address present in the email data structure for the given input name. Higher the weight of the predicted email address, closer is the predicted email address to the input name and hence the predicted email address is more likely to be the required email address. If an email address has a weight of 5 and another email address has a weight of 7, then the email address with weight 7 is closer to the input email address and hence it may be the required email address.

Weightbasedonnamematch 913 stores the weight based on the user name match in the email address. Similar matches for the input user names are stored in the Weightbasedonnamematch 913. For example, if the user name pattern in the email address is of the form firstname_lastname, the patterns appearing in the search results with the format firstname_lastname will get a higher weight compared to other patterns. The weight assigned to the patterns is stored in Weightbasedonnamematch 913.

Weightbasedondomainmatch 914 stores the email domains appearing in the email addresses. For example, consider the email addresses company.com which has a weight of 4 and company.co.uk has a weight of 8. Weightbasedondomainmatch 914 stores weight under the domains company.com and company.co.uk respectively.

Weightbasedonsourcemap 915 stores the weight of the sources. Sources can be internal database records of companies, web search engines and the like. Weight is assigned based on how accurate the pattern of email address is to the input email from the source obtained. In an example, a source may be assigned a weight of 6 and another source may have a weight of 10. The source with weight of 10 is more close to the required email address pattern.

Weightbasedonpatternmatch 916 stores, the weight of emails for those patterns, which are close to the input email address pattern. In an example, a pattern of the form lastname.firstname may have a weight of 9 and the pattern firstname.lastname may have a weight of 12. Since, the pattern with weight of 12 is close to the required email address the weight of the pattern is stored in Weightbasedonpatternmatch 916.

Total weight 917 stores the total weight of all the emails addresses. Weight indicates a numerical that may be assigned to each pattern, depending on the number of email addresses in that pattern and closeness of the email address pattern to the required email address.

Email count 918 stores the total count of emails obtained under each pattern from the search results. In an example, if the email address with the pattern lastname_firstname has a total of 14 emails, then the email count 918 stores the count as 14.

Weightbasedoncompanynearemails 919 stores total number of email address patterns, which are close to the input email address pattern for a particular company. For example, the email address for a particular company may be formed by including firstname and/or lastname and department of the employee working for the company. Different email address patterns, such as the patterns with firstname and department, patterns with lastname and department and patterns with firstname, lastname and department are assigned different weights. The pattern which is closest to the input email address pattern is assigned the highest weight and stored in Weightbasedoncompanynearemails 919.

FIG. 10 depicts a data structure for calculating statistics of all email addresses, according to embodiments disclosed herein. Each part of an email address is stored as an object in the email part which constitutes emailpartobject. For example, some patterns of email addresses comprise of three parts, which include first name, middle name and last name. The first name, middle name and last name are stored as separate objects in emailpartobject. The members of the emailpartobject provide information, which can be used to predict probable patterns of email addresses.

Emailpartstring 1001 stores the user name in the email address as separate objects. For example, some patterns of email addresses comprise of three parts, which include first name, middle name and last name. The first name, middle name and last name are stored as separate objects in emailpartstring 1001. The members of the email part string 1001 provide information which can be used to predict probable patterns of email addresses.

Alphabet count 1002 stores the total count of the alphabets in the user name of the email address. In an example, consider the email address brown.gorge@yahoo.com, the alphabet count 1002 stores the total alphabet count as ten. Special characters such as dot (.), hyphen (-) and so on are not included in the alphabet count 1002.

Special character count 1003 stores the count of special characters in the user name string such as dot (.), underscore (_), hyphen (-) and so on. In an example, consider the email address gorge.gary@yahoo.com, the special character count 1003 stores the special character count as one (for dot (.)).

Number count 1004 stores the total number of numeric characters appearing in the user name of the email address. Consider an example, for an email address brown190.gary@hotmail.com, the number count 1005 stores a count of 3.

Vowel count 1005 stores the total number of vowels in the user name of the email address. Vowel count 1005 checks for the vowels a, e, i, o, u and on finding any of them in the user name of the email address, the vowel count 1005 is incremented. In an example, the email address aura.grey@hotmail.com, vowel count 1005 stores the count as 4 (for two a's, one u and one e).

Istwoconsonantatthestart 1006 has a Boolean value. If the beginning two characters of the user name string of the email address are consonants, then Istwoconsonantatthestart 1006 has a "true" value. If the beginning two characters of the user name string of the email address are not consonants, then Istwoconsonantatthestart 1006 has a "false" value. In an example, for the email address james.black@hotmail.com, Istwoconsonantatthestart 1006 stores a value of "false". The user name in the email address has a consonant (j) as the first character, whereas the second character in the user name is a vowel (a). Hence, Istwoconsonantatthestart 1006 stores a value "false".

Dbfirstname 1007 stores the first names of the user name of the email addresses, along with the number of characters in the first name. Dbfirstname 1007 is an object of dictionary that stores the first names only. In an example, for an email address brown_gary@hotmail.com, Dbfirstname 1007 stores "brown" as the first name in with a character count of five.

Dblastname 1008 is an object of dictionary that stores the last names of the user name from the email address of the user along with the count of the characters in the last name. In an example, consider an email address brown_gary@hotmail.com, Dblastname 1008 stores "gary" as the last name with a character count of four.

Dbnickname 1009 is an object of dictionary that stores the nick names of the user name from the email address of the user. In an example, for the email address jeff.jeffery@hotmail.com, the Dbnickname 1009 stores "jeff" as the nick name of the user.

Dbknown 1010 is an object of dictionary that stores that all words that appear on the source web page. Source web page can include web pages of companies and the like. Words appearing on the web page such as contact us, home, search and the like are stored in Dbknown 1010. Consider an example, jolly.search@hotmail.com, Dbknown 1010 stores "search" as the word appears on the web page.

The Dbunknown 1011 is an object storing known words that appear on the source web page. Known words include words on the web page that are not company names or names of individuals are stored. Common words appearing on the source web page such as account, login, create, password and so on are stored in Dbunknown 1011. For example, for the email address of the form xyz.account@hotmail.com, Dbunknown 1011 stores "account".

DbGeneralemail 1012 is an object of dictionary that stores words such as information, sales, support in a tree data structure. Words such as sales, support and the like cannot be used in the user name of the email address. In an example, for the email address company.sales@yahoo.com, DbGeneralemail 1012 stores "sales".

Figure 11:
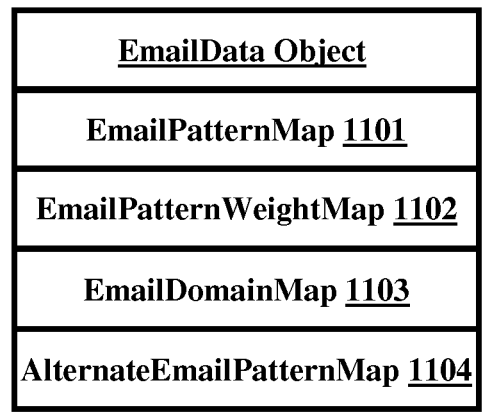
FIG. 11 depicts an email data object, according to embodiments disclosed herein.

FIG. 11 depicts an email data object, according to embodiments disclosed herein. The obtained statistical information for all email addresses is stored in email data object. The email data object class has member data to store statistics such as number of occurrences of an email domain, occurrences of email address patterns, weight associated with each pattern and so on.

The emailpatternmap 1101 is a data structure, which associates the data as key and value. Key is defined as the unique identifier for a particular item of data. Key uniquely defines a particular set of data among other data sets. Value may be a data that has been identified or a pointer to the location of the data.

The emailpatternweightmap 1102 stores the number associated with each pattern as the key and the number of email addresses in the pattern as the value. Number defines a numerical that may be assigned to a particular pattern. For example, the email address with the pattern lastname.firstname may be assigned a number of 2. When the emailpatternweightmap 1102 finds an email address with the pattern lastname.firstname, emailpatternweightmap 1102 stores the number as 2. Higher the weight for a particular pattern map, greater is the probability of the email address pattern being the required pattern. As an example, for a particular pattern, the weight count may be 6, whereas for another pattern the count may be 5. In such a case, the pattern with the count 6 may be closest to the required email address.

Emaildomainmap 1103 stores the web domain appearing in the email addresses as the key and number of emails in that web domain as the value. For example, consider the email address domain of the type company.co.uk, this domain company.co.uk is stored in the emaildomainmap 1110 as key. If there are 10 email addresses under the domain company.co.uk, then 10 is stored as value for that web domain.

Alternate email pattern map 1104 stores the number associated with each pattern as key and the number of emails with that pattern as value. The number indicates the numerical that may be assigned to a particular email address pattern. In an example, the pattern firstname.lastname may be assigned a number of 6, and the number of emails with the same pattern may be 7. In such a case, 6 is stored as key and 7 is stored as value. This map stores multiple patterns for a single email due to ambiguity in database matches.

Figure 12:
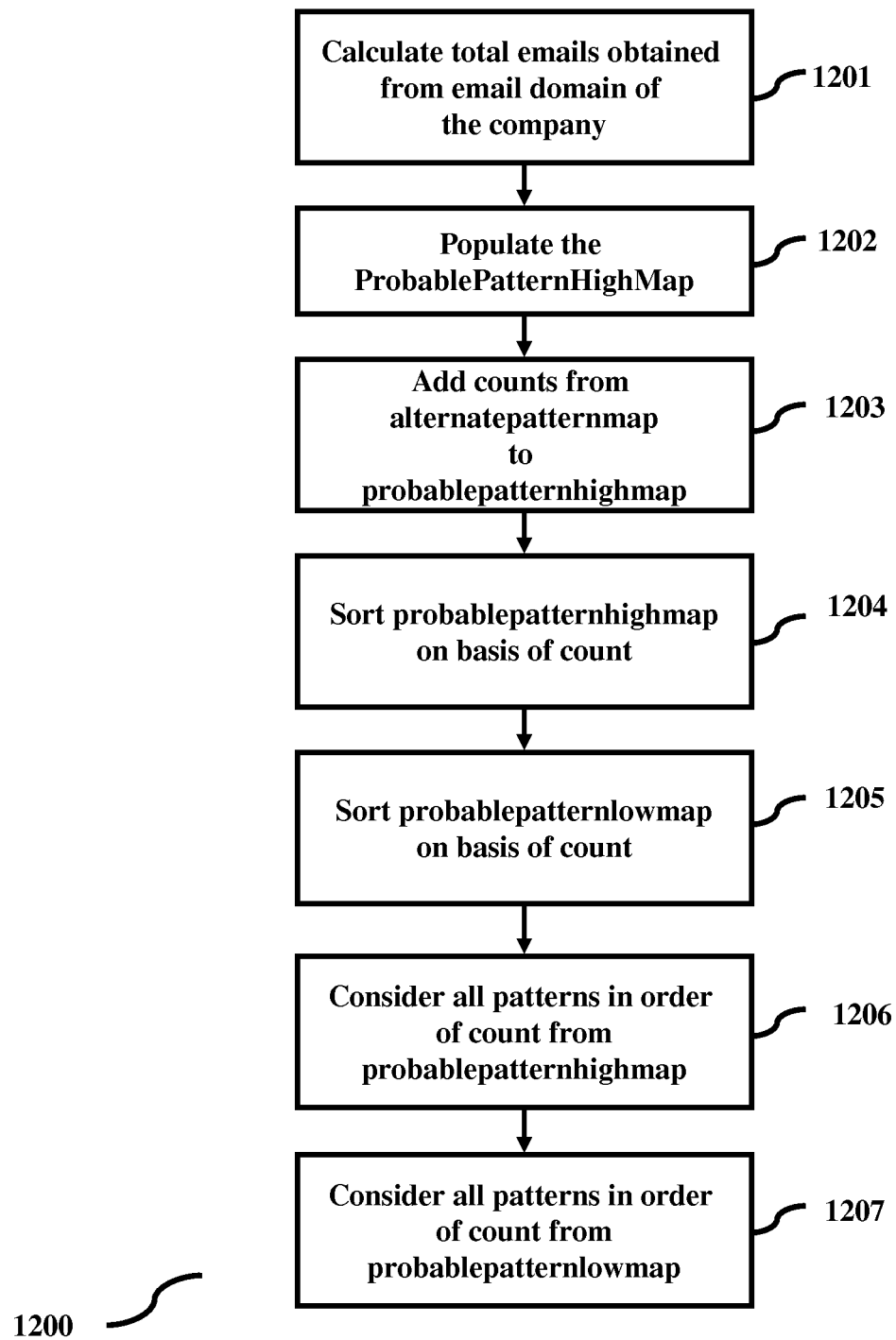
FIG. 12 is a flowchart depicting a process for pattern finding, according to embodiments disclosed herein.

FIG. 12 is a flowchart depicting a process for pattern finding, according to embodiments disclosed herein. The email data class is equipped with the collection of different email address patterns found from different email addresses. These patterns are processed, based on the frequency of their occurrences, to find the email address patterns for a company. The collections are categorized into two types i.e. Email Pattern Map and Alternate Email Pattern map. The given email address pattern is compared with the two maps. On the basis of the closeness of the two maps to the pattern, the closest map to the email address pattern is the most probable email address pattern. The most probable email address pattern is populated into two arrays, each array being associated with the email pattern map and the alternate email pattern map respectively. Each array is assigned a weight associated with each map. Further, the most probable email address pattern is stored in the form of probable pattern high map and probable pattern low map. The total number of email addresses obtained from the email domain of a company is calculated (1201). The email domains of a company can vary in different formats like the company.com, company.co.uk etc. The general categories of user names can be of the form of 'Fn separator Ln', 'Ln separator Fn', 'Fi separator Ln', 'Ln separator Fi' and the like. Fn indicates the first name in the user name of the email address. Ln is the last name in the user name of the email address. Fi is the first initial in the user name of the email address. Separator can be any character like a period ( ), underscore (_) or hyphen (-). The total numbers of email addresses obtained are stored as a number 'n'.

Once the total number of email addresses are obtained and stored, the next step is to populate (1202) the probable pattern high map. The probable pattern high map is populated with the patterns from the email pattern map, which have a frequency of occurrence greater than the threshold value of the total emails. Threshold value indicates the minimum value a pattern should satisfy, for the email address pattern to be taken into consideration. For instance, if the total number of emails is say 120, occurrence of the pattern with the format firstname_lastname@company.com is 35 and percentage of the pattern is 29% of the total email addresses. If the threshold value is 20%, then the pattern firstname_lastname@company.com is added to the probable pattern high map, as it constitutes 29% of the total emails.

Other patterns where the pattern is less than 20% of the total email addresses are not added into the probable pattern high map. If the pattern is less than 20%, the patterns are added into a temporary remaining pattern array. The patterns for the email pattern map are populated into probable pattern high map, if the frequency of occurrence of the pattern is lesser than the threshold value, but are still valid patterns for the company. For instance, consider the patterns, firstname.lastname having a frequency of occurrence of 14, lastname.firstname having a frequency of occurrence of 3, firstname_lastname having a frequency of occurrence of 1 and lastname_firstname having a frequency of occurrence of 11. The pattern firstname.lastname has a higher frequency of occurrence compared to other patterns. However, patterns with low frequency of occurrence may also be included in the probable pattern high map, if the email address pattern is valid for the company. For example, the email address pattern for a particular company may be of the form lastname.firstname. The pattern lastname.firstname has a frequency of occurrence of only 3, yet the pattern may be included in the probable pattern high map as the pattern is the valid pattern for the company. Now, for each pattern in the probable pattern high map, we find the corresponding similar array. If the similar array is not found, the search continues. On the other hand, on finding a similar array, the pattern is removed from the remaining pattern array. The remaining pattern array will have valid patterns, but have low frequency. These patterns, from remaining pattern map, with the count value are taken form the email pattern map to the probable pattern map.

The next step is to add (1203) the counts from the alternate pattern map to the probable pattern high map. Consider, the probable pattern high map has firstname.lastname@company.com and lastname.firstname@company.com. These patterns are also present in the alternate pattern map. For each pair of email addresses in the alternate pattern map, look up each pattern of the pair in probable pattern high map. If only one pattern is found, then add the count associated with the index in the alternate pattern map to the probable pattern high map. In case two patterns are found, accept both the patterns and add the counts, according to frequency of occurrence of each pattern. In another instance, if the pattern is not found in the probable pattern high map due to low count, but there are high counts in the alternate map, add the email pattern map count to the probable pattern low map count. Now add the alternate pattern map to probable pattern low map. Even if an email pattern has the highest count pattern, a lower rating is given as the actual pattern is still not known.

The entire probable pattern high map is sorted (1204) on the basis of the count. Priority is assigned to each email pattern. The email pattern with maximum count is assigned highest priority and priority decreases with decrease in count.

The entire probable pattern low map is sorted (1205) on the basis of the count. Priority can be assigned to each pattern. The pattern with maximum count is assigned highest priority and priority decreases with decrease in count.

Consider (1206) all the patterns from the probable pattern high map in the order of their count. Either of two conditions is checked for considering the patterns. One condition checks if the pattern count in the probable pattern is greater than the threshold value. Second condition checks if the difference in percentage between the given pattern and the highest pattern is less than the threshold value. The patterns are then grouped on the basis of their counts.

Similar to grouping of patterns in the probable pattern high map, the patterns in the probable pattern low map are grouped, by considering (1207) all the patterns in the order of their counts. Either of the two conditions may be checked for grouping. One condition checks if the email pattern count is lesser than the threshold value. The second condition checks if the difference in percentage between the given email pattern and the email pattern with highest count is lesser than the threshold value. Patterns are grouped on the basis of count.

The various actions in method 1200 may be performed in the order presented, in a different order or simultaneously. Further, in some embodiments, some actions listed in FIG. 12 may be omitted.

Figure 13A:
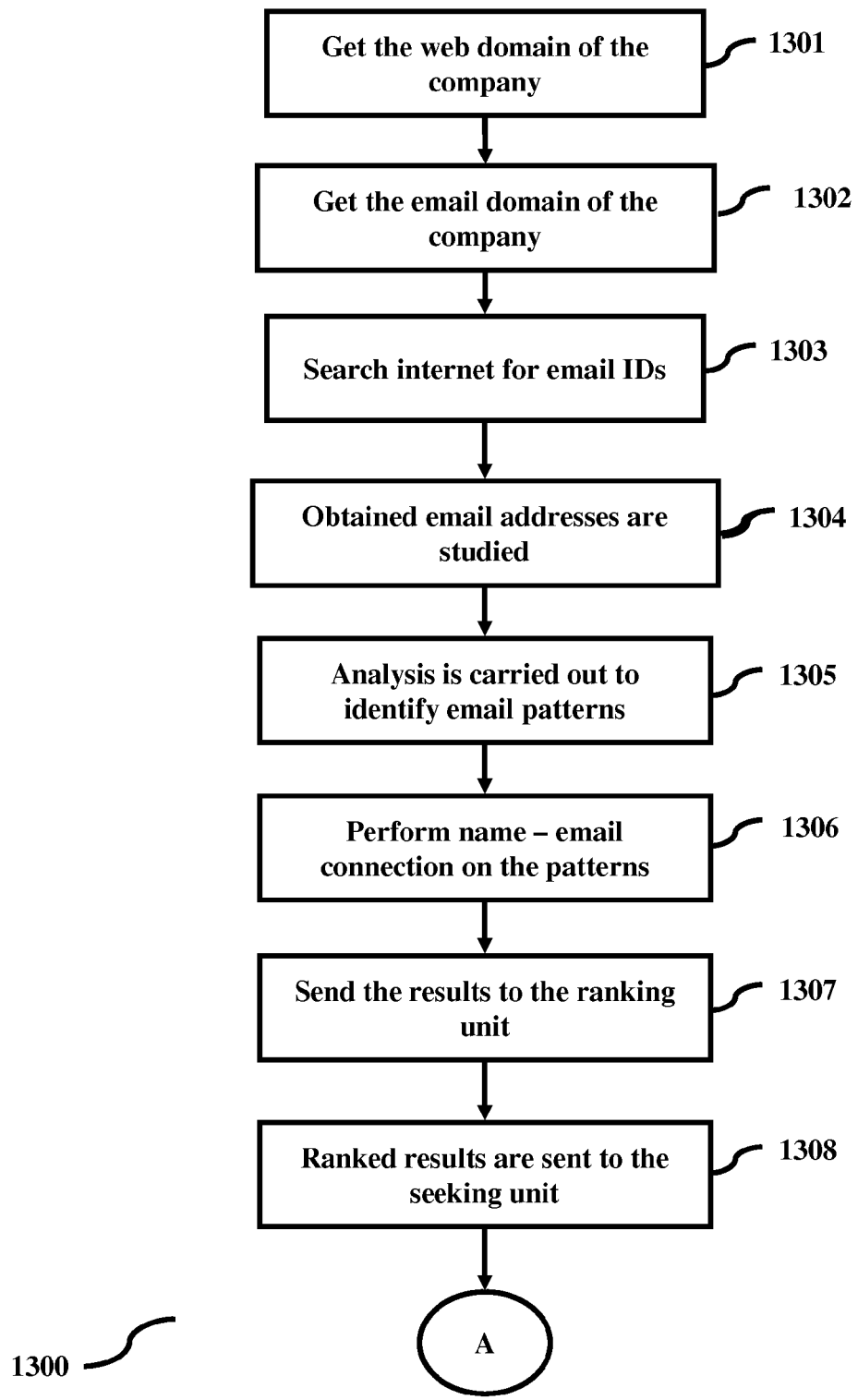
FIG. 13 is a flowchart depicting a process for finding an email address, according to embodiments disclosed herein.

FIG. 13 is a flowchart depicting a process for finding an email address, according to embodiments disclosed herein. To obtain the email address of a company, the web domain of the company is obtained (1301) by the seeking unit 101. In order to obtain the web domain of the company, a search is performed by the seeking unit 101 on the Internet using different queries. Search can be performed by the seeking unit 101 using different Internet sites such as Google, Yahoo, or websites of some companies.

Once the web domain of the company is obtained, the seeking unit 101 obtains (1302) the email domain of the company. Email domain is usually unique for a particular company and provides information regarding the company, employees, and the domain of employees and so on. As an illustration, the email domain for a company can be in the form of company.com, company.co.uk.

The seeking unit 101 searches (1303) the Internet for different email addresses. Search can be performed using general search queries on different search engines. The obtained details of the web domain of the company and email domain of the company are used to obtain different email addresses of the company. The email address could be the email addresses of the employees working for the company.

The obtained email addresses are studied (1304). A comparison is made to study the pattern of the email addresses. Different patterns in the email addresses are identified (1305). The patterns may be classified into different groups, based on comparative analysis performed on the patterns. The search results are used to perform (1306) name email connection i.e. an attempt is made to identify the email address for the company by linking the patterns in the obtained emails. The email address patterns can vary as some patterns can have first name at the beginning, whereas other patterns can have last name at the beginning and so on.

The search patterns obtained by the seeking unit 101 are sent to the ranking unit 102. The ranking unit 102 ranks (1307) the email patterns on the basis of how close the email pattern is to the obtained set of email patterns. The email pattern which has the highest occurrence and is very close to the required email pattern is given a higher priority.

The ranked results are then sent (1308) by the ranking unit 102 to the seeking unit 101. The seeking unit 101 stores the ranked results in the database 104. If the seeking unit 101 has to obtain (1309) the email address information using various sources, then the seeking unit 101 generates the email address information based on certain rules, which are fetched from the database 104. The rules may be generated (1310) by the seeking unit 101 using an indexing process and pattern generation. The rules may also be defined by the user.

The next step is to obtain (1311) the probable patterns by the seeking unit 101 by applying rules. A set of email patterns which are close to the obtained results are chosen. The email pattern with the highest rating is likely to be the required email pattern.

On obtaining the probable email address patterns, the email address with the highest rating is selected as the most probable email address. The most probable email address is then displayed (1313) to the user. The most probable email address is displayed to the user using the information display unit 106. In case there is more than one most probable email address, then the user may select the correct email address. The probable email addresses are stored in the database 104.

The various actions in method 1300 may be performed in the order presented, in a different order or simultaneously. Further, in some embodiments, some actions listed in FIG. 13 may be omitted.

Figure 14:
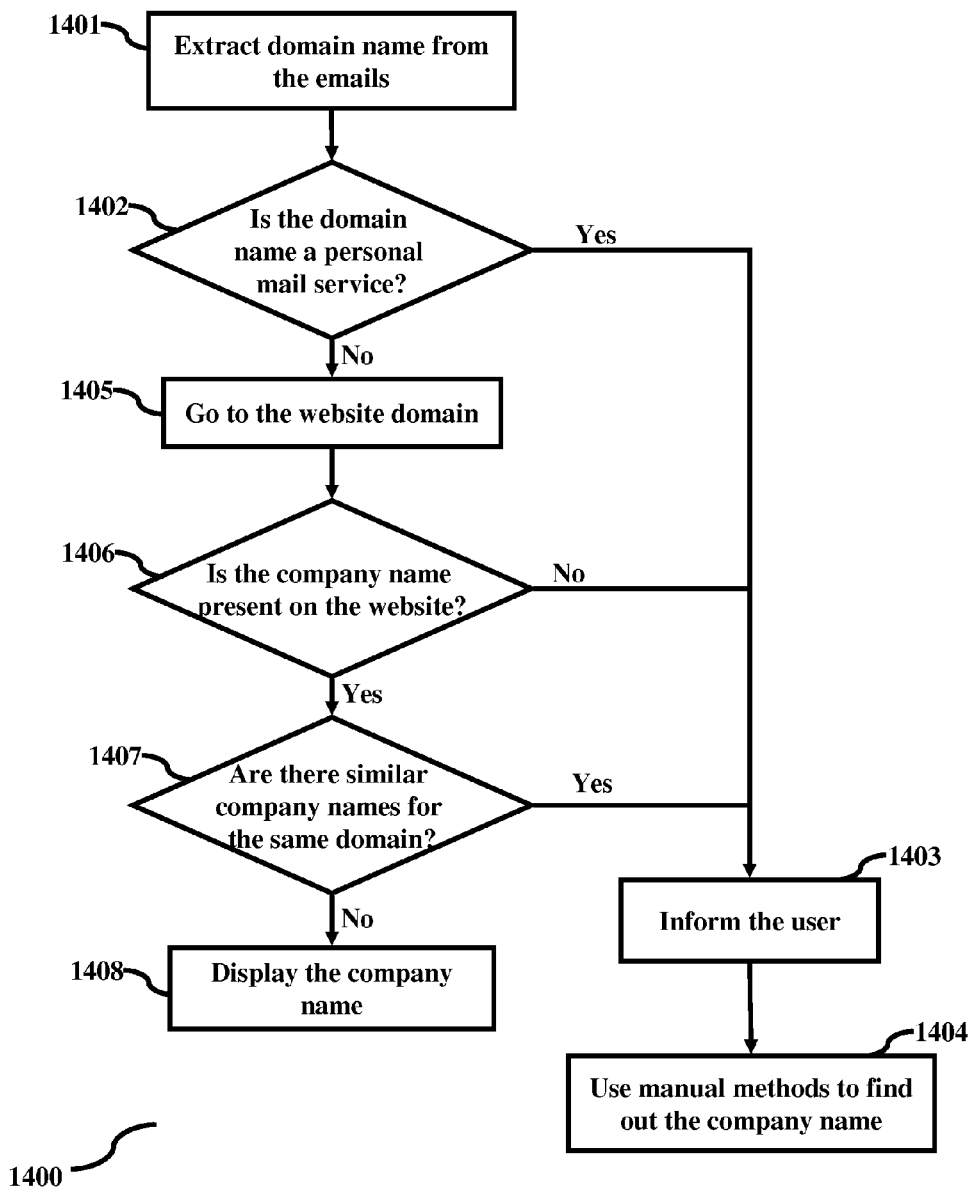
FIG. 14 is a flowchart depicting a process for finding the company name of a person using his email address, according to embodiments disclosed herein.

FIG. 14 is a flowchart depicting a process for finding the company name of a person using his email address, according to embodiments disclosed herein. At first, the email domain name is extracted (1401) from the email addresses of the person, where the email address of the person is supplied by the user. The email domain name may be any Internet site such as Yahoo, Hotmail and so on. The email domain name may also be a company email domain.

A check (1402) is made if the email domain name is a personal mail service provider such as Gmail, Hotmail etc or the domain is specific for the company. In case the domain name is of a personal mail service provider, the user is informed (1403). The user may then employ manual methods to find out the company name, such as performing a general search on Google website or the like. On the other hand, in case the email domain name does not belong to a personal service provider, details regarding the website domain are checked (1404).

If the email domain does not belong to a personal mail service provider, the contents of the website domain are checked (1405). The website domain is checked (1406), to see if the company name is present on the website. In an example, the "contact us" section of the web page for a company may comprise of the company name and details of the company. If there is no information about the company name on the website, the user is informed and user may employ some manual methods to find out the name of the company. In case the company name is present on the website, a check (1407) is performed if there are any similar company names for the same domain. For example, the abbreviations for two different company names could be ccg-.com. Wherein the full name of "ccg" for one company could be construction company group and the full name of "ccg" for another company could be computer coding group. If there are company names with the same domain, the user is informed and user may employ other manual methods like performing a general search to obtain the name of the company. In case there are no other company names with the same domain, the obtained name is the required company name. The seeking unit 101 sends (1408) the information to the information display unit 107.

The various actions in method 1400 may be performed in the order presented, in a different order or simultaneously. Further, in some embodiments, some actions listed in FIG. 14 may be omitted.

Figure 15:
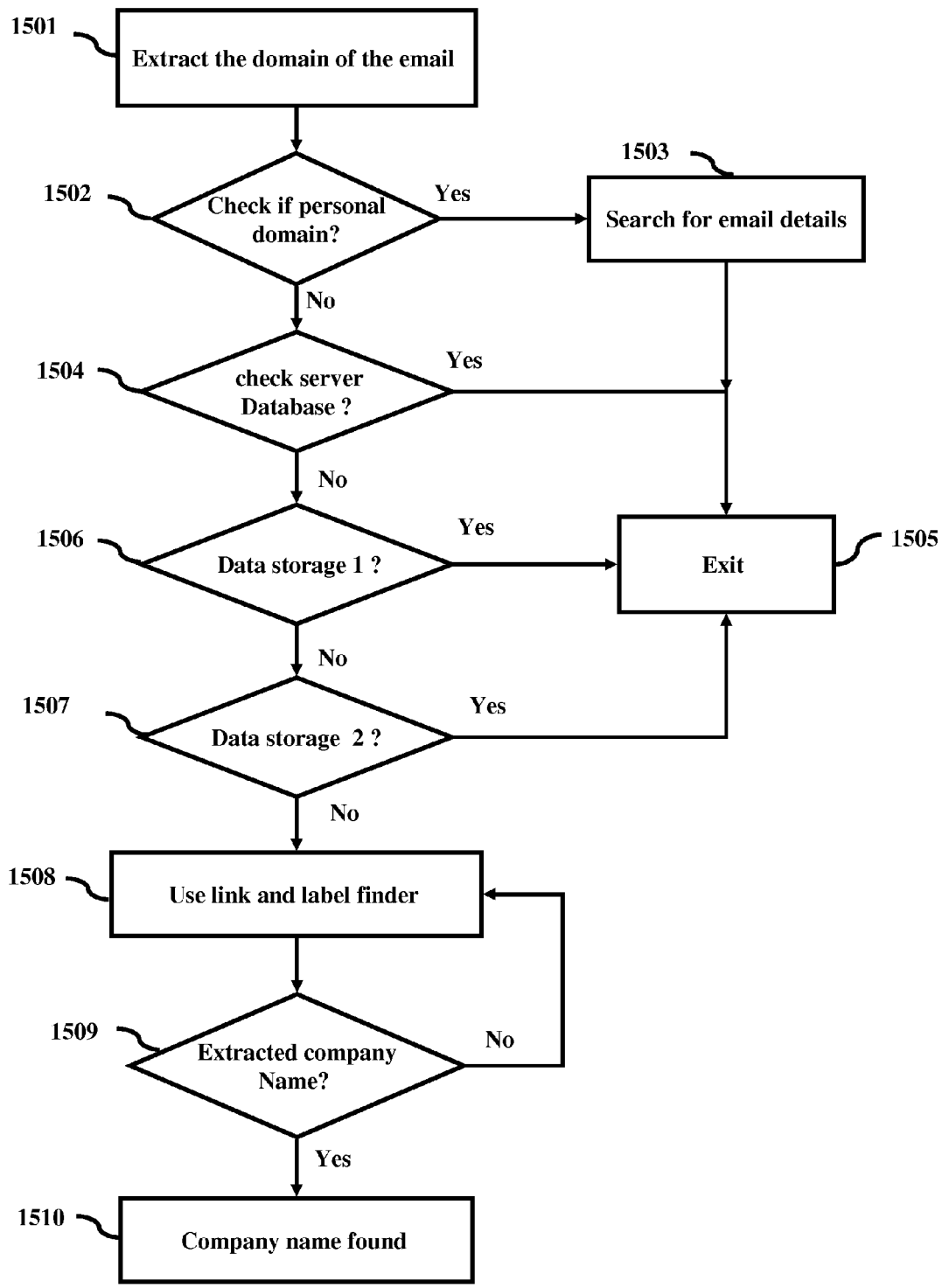
FIG. 15 is a flow chart depicting a process for finding the company and name of a person from the email address, in accordance with the embodiments herein.

FIG. 15 is a flow chart depicting a process for finding the company and name of a person from the email address, in accordance with the embodiments herein. The email address given by the user is used to obtain (1501) the email domain. Different email search strings are used to search for email addresses with the email domain using search engines. Email addresses are analyzed and classified as email address with separators and without separators. The email addresses are processed to extract the name of the person. On obtaining the email domain, a check (1502) is made if the domain is a personal domain such as Gmail, Hotmail and the like. If the email domain is a personal email domain, the email address details are searched (1503) on personal websites such as Google. A data storage finder searches in sources found using the personal website for the name of the company. In case, the data storage does not find the company name, suitable source logic is used to obtain the name of the company. The source logic may be a query in the email domain. In an example, a keyword may be used in the search engine to obtain the company name in the first search result. The company name may be extracted from the label or text within the search results. If the company name is not found, links available among the search results can be used to go to the home page of the company web site. Further, using a suitable algorithm, name of the company can be extracted from the company's home page. The process is further exited. If the domain is not a personal domain, server database is checked (1504). The server database can be any database with the information about the company, which are part of the deep web search performed and not found while querying the search engines. In the server database, a search is performed to obtain the company name. On obtaining the company name, the process is exited (1505). On the other hand, if the company name is not obtained from server database, a check is performed in a data storage 1. The data storage 1 is another repository which may contain the company name. During the data storage 1 check, a search is performed (1506) to obtain the company name and the email domain of the company is validated. The validation is performed to basically avoid any extraneous characters in the email address details. If the company name is obtained, then the process is exited. In case the company name is not obtained, a data storage 2 is checked (1507). The data storage 2 is a third data repository which may contain the company name. During the data storage 1 check, a search is carried out to obtain the company name and validate the email domain. The email domain is validated to avoid any extraneous characters. If the company name is obtained in the data storage 2 check, the process is exited. Once the company website is obtained, a search is performed for the company name in the website home page. In case the company name is not obtained, link and label finders are used (1508) to find the name of the company using a web based search engine. The search engine may any Internet based search engine such as Google, Yahoo Search and so on. The link and label finders may be any search string which may be used on the search engine such as a string comprising of name, email domain etc Further, a check (1509) is made if the name of the company is obtained. In case the company name is obtained, a message is displayed (1509) to the user stating that the company name is found, along with the name of the company. If the company name is not yet obtained, step (1508) is repeated.

Figure 16:
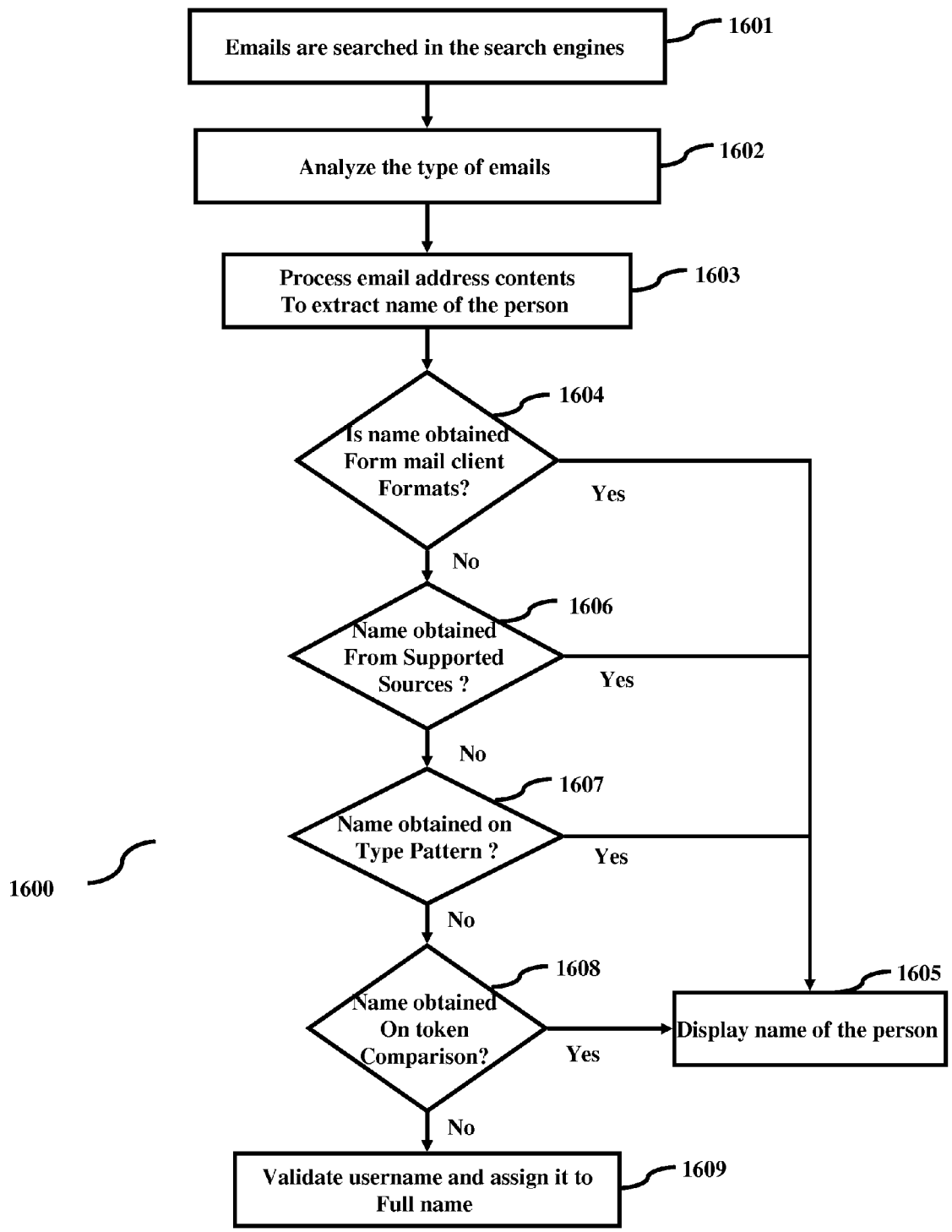
FIG. 16 is a flow chart depicting a process for finding the name of a person from the email address, in accordance with the embodiments herein.

The various actions in method 1500 may be performed in the order presented, in a different order or simultaneously. Further, in some embodiments, some actions listed in FIG. 15 may be omitted FIG. 16 is a flow chart depicting a process for finding the name of a person from the email address, in accordance with the embodiments herein. Different email addresses are obtained (1601) by the seeking unit 101 by performing search in the search engines. Search engines mine different databases 104, Internet sites and so on to obtain the email addresses. Depending on the type of information required the query is constructed. A number of email patterns are obtained from the search results. On obtaining email addresses, emails addresses are analyzed (1602) to identify the pattern of emails addresses. Emails addresses are classified into emails with separators and emails without separators. Separators can include dot, underscores, hyphen and so on. Further, the contents of the email address are processed (1603) in order to extract name form the email address. Mail client formats are checked (1604) in order to extract the name of the person from the email address. Mail client formats may have certain specific patterns for the email address, from which it is possible to obtain the name. For example, certain email patterns have firstname.lastname@company.com or firstname_lastname@company.com. The email pattern can be studied to obtain the name appearing first as the name of the person. If the name is obtained from the format, the name is displayed (1605) to the user.

In case it is not possible to extract the name from the email address using mail client format, a check (1606) is made if the name can be obtained from supported sources. Supported sources could be portals, job portals, company web sites, online databases and the like. If the name is extracted from the sources, the name is matched with the email address to check for correlation of name and email address. On the other hand, if it is not possible to obtain the name from support sources, a check (1607) is made if the name can be obtained on the type pattern using pattern analysis. During pattern analysis, the most common possible patterns are generated based on the user name in the email address, user name is split based on the email patterns and the email pattern which is close to the name pattern is chosen. The name is then extracted from the pattern. If the pattern is not close to the email address, then a check (1608) is made for token comparison. In token comparison, the user name in the email address is compared with tokens in a source. The source could be a web page or a database, where the email address has been located. The tokens could be probable names narrowed down on the basis of the user name. For example, if the user name is cbodapati, then probable tokens could be Chandra Bodapati, Chetan Bodapati and so on. If the name is not obtained from the token comparison too, then the user name in the email address is validated (1609) and assigned as the full name of the person.

The various actions in method 1600 may be performed in the order presented, in a different order or simultaneously. Further, in some embodiments, some actions listed in FIG. 16 may be omitted.

The functions of the various elements shown in the FIGs., including any functional blocks labeled as "processors", may be provided through the use of dedicated hardware as well as hardware capable of executing software in association with appropriate software. When provided by a processor, the functions may be provided by a by a plurality of individual processors, some of which may be shared. The processors may be a special purpose microcontroller with a display. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A computerized method of providing a user with an email address of a second person by providing a system which includes at least a seeking unit running on a processor which generates said email address using a plurality of rules, the method comprising:
  finding a web domain for a target organization using said seeking unit;
  finding an email domain for said target organization using said seeking unit;
  collecting email addresses belonging to said email domain using said seeking unit;
  collecting corresponding names for said email addresses using said seeking unit;
  inferring patterns from said email addresses and said corresponding names using said seeking unit; and
  displaying probable email addresses matching said inferred patterns to said user;
  wherein said inferring of patterns includes:
    extracting usernames from said collected email addresses using said seeking unit;
    calculating statistical information for each of said names and said usernames;
    applying a first set of rules to each of said names and said usernames to obtain statistics using said seeking unit;
    summing up said statistics for all of said names and corresponding email addresses using said seeking unit; and
    applying a second set of rules to said statistics to infer said patterns in said collected email addresses using said seeking unit; and
  wherein said first and second sets of rules are generated by identifying patterns from email addresses collected from email addresses belonging to said email domain, and wherein said finding said email domain includes:
    finding the email domain which identifies said target organization and matches said web domain of said target organization; and
    finding said email domain which identifies said target organization and does not completely match said web domain of said target organization.

2. The method as claimed in claim 1, wherein said step of finding said web domain further comprises said seeking unit querying search engines on Internet for said web domain.

3. The method as claimed in claim 1, wherein said step of finding said email domain further comprises said seeking unit querying said web domain for said email domain.

4. The method as claimed in claim 1, wherein said statistics comprises:
  alphabet count of said usernames;
  number count of said usernames;
  separator count of said usernames;
  a match for first name of said name in said usernames; and
  a match for last name of said name in said usernames.

5. The method as claimed in claim 1, wherein priorities for said patterns are calculated by said seeking unit, wherein a priority for a specific pattern of email address relies on probability of frequency of said specific pattern of email address.

6. The method as claimed in claim 1, wherein said plurality of rules are generated by said seeking unit using an indexing process and a pattern generation process.

7. The method as claimed in claim 6, wherein said indexing process involves verification of rules specific to said target organization and further comprises verification of data and rules, wherein data is an entry in an address book, which comprises fields including name, residential phone number, official phone number, cellular phone number, email address, office address, residential address, and fax number.

8. The method as claimed in claim 6, wherein said pattern generation process further comprises of detecting and generating a specific email address pattern that is used by said target organization for generating email addresses for employees of said target organization.

9. The method as claimed in claim 1, wherein said plurality of rules are specified by said user.

* * * * *